US012630088B2

(12) United States Patent
Uken et al.

(10) Patent No.: US 12,630,088 B2
(45) **Date of Patent: \*May 19, 2026**

(54) VEHICULAR REARVIEW MIRROR CONTROL SYSTEM

(71) Applicant: Magna Mirrors of America, Inc., Holland, MI (US)

(72) Inventors: John T. Uken, Jenison, MI (US); Darryl P. De Wind, West Olive, MI (US); Gregory A. Huizen, Hudsonville, MI (US); Rodney K. Blank, Zeeland, MI (US)

(73) Assignee: Magna Mirrors of America, Inc., Holland, MI (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/989,003

(22) Filed: Dec. 20, 2024

(65) Prior Publication Data

US 2025/0115183 A1     Apr. 10, 2025

Related U.S. Application Data

(60) Continuation of application No. 18/607,618, filed on Mar. 18, 2024, now Pat. No. 12,179,668, which is a (Continued)

(51) Int. Cl.
*B60R 1/08* (2006.01)
*B60R 1/04* (2006.01)

(52) U.S. Cl.
CPC ............... *B60R 1/088* (2013.01); *B60R 1/04* (2013.01)

(58) Field of Classification Search
None
See application file for complete search history.

(56) References Cited

U.S. PATENT DOCUMENTS 3,427,096 A     2/1969  Dykema et al.
4,435,042 A     3/1984  Wood et al.
(Continued)

OTHER PUBLICATIONS

"Car Wireless Rearview Camera System Car Bluetooth Handfree Rearview Mirror," Souq.com N.p. Nov. 16, 2013 Web Mar. 2, 2017 <http://web.archive.org/web/20131116070456/http://uae.souq.com/ ae-en/car-wireless-rearview-camera-system-car-bluetooth-handsfree- rearview-mirror-3-5inch-monitor-wireless-earpiece-5034623/i/>.

(Continued)

*Primary Examiner* — Kaitlin A Retallick
(74) *Attorney, Agent, or Firm* — HONIGMAN LLP

(57) ABSTRACT

A vehicular rearview mirror control system includes an interior rearview mirror assembly and a rearward-viewing camera disposed at a vehicle. The system, via processing of a first subset of image data captured by the rearward-viewing camera, is operable to detect ambient light rearward of the equipped vehicle. The system, via processing of a second subset of the image data captured by the rearward-viewing camera, is operable to detect light emanating from a headlight of another vehicle following the equipped vehicle. The first subset of the image data captured by the rearward-viewing camera is different than the second subset of the image data captured by the rearward-viewing camera. Responsive to determining that the detected light emanating from the headlight of the other vehicle glares a driver of the equipped vehicle, the ECU controls dimming of the electro-optic mirror reflective element of the interior rearview mirror assembly.

33 Claims, 18 Drawing Sheets

Related U.S. Application Data continuation of application No. 18/305,477, filed on Apr. 24, 2023, now Pat. No. 11,932,169, which is a continuation of application No. 17/822,834, filed on Aug. 29, 2022, now Pat. No. 11,634,078, which is a continuation of application No. 17/301,476, filed on Apr. 5, 2021, now Pat. No. 11,427,127, which is a continuation-in-part of application No. 17/249,685, filed on Mar. 10, 2021, now Pat. No. 11,543,724, which is a division of application No. 16/098,177, filed as application No. PCT/IB2017/052542 on May 2, 2017, now Pat. No. 10,948,798, said application No. 17/301,476 is a continuation of application No. 16/164,895, filed on Oct. 19, 2018, now Pat. No. 10,967,796, which is a continuation-in-part of application No. 14/712,200, filed on May 14, 2015, now abandoned.

(60) Provisional application No. 62/595,169, filed on Dec. 6, 2017, provisional application No. 62/587,651, filed on Nov. 17, 2017, provisional application No. 62/583,742, filed on Nov. 9, 2017, provisional application No. 62/575,649, filed on Oct. 23, 2017, provisional application No. 62/471,491, filed on Mar. 15, 2017, provisional application No. 62/371,256, filed on Aug. 5, 2016, provisional application No. 62/344,527, filed on Jun. 2, 2016, provisional application No. 62/340,679, filed on May 24, 2016, provisional application No. 62/338,124, filed on May 18, 2016, provisional application No. 62/330,556, filed on May 2, 2016, provisional application No. 62/032,036, filed on Aug. 1, 2014, provisional application No. 62/006,392, filed on Jun. 2, 2014, provisional application No. 62/001,350, filed on May 21, 2014, provisional application No. 61/993,333, filed on May 15, 2014.

(56) References Cited

U.S. PATENT DOCUMENTS

| | | | |
|---|---|---|---|
| 4,436,371 A | | 3/1984 | Wood et al. |
| 4,712,879 A | | 12/1987 | Lynam et al. |
| 4,826,289 A | | 5/1989 | Vandenbrink et al. |
| 4,948,242 A | | 8/1990 | Desmond et al. |
| 5,066,112 A | | 11/1991 | Lynam et al. |
| 5,073,012 A | | 12/1991 | Lynam |
| 5,076,673 A | | 12/1991 | Lynam et al. |
| 5,115,346 A | | 5/1992 | Lynam |
| 5,117,346 A | | 5/1992 | Gard |
| 5,128,799 A | | 7/1992 | Byker |
| 5,140,455 A | | 8/1992 | Varaprasad et al. |
| 5,142,407 A | | 8/1992 | Varaprasad et al. |
| 5,151,816 A | | 9/1992 | Varaprasad et al. |
| 5,151,824 A | | 9/1992 | O'Farrell |
| 5,239,405 A | | 8/1993 | Varaprasad et al. |
| 5,253,109 A | | 10/1993 | O'Farrell et al. |
| 5,327,288 A | | 7/1994 | Wellington |
| 5,406,414 A | | 4/1995 | O'Farrell et al. |
| 5,424,865 A | | 6/1995 | Lynam |
| 5,446,576 A | | 8/1995 | Lynam et al. |
| 5,500,760 A | | 3/1996 | Varaprasad et al. |
| 5,525,264 A | | 6/1996 | Cronin et al. |
| 5,530,240 A | | 6/1996 | Larson et al. |
| 5,550,677 A | * | 8/1996 | Schofield ............. G01J 1/4204 |
| | | | 348/E7.086 |
| 5,567,360 A | | 10/1996 | Varaprasad et al. |
| 5,610,756 A | | 3/1997 | Lynam et al. |
| 5,668,663 A | | 9/1997 | Varaprasad et al. |
| 5,670,935 A | | 9/1997 | Schofield et al. |
| 5,688,663 A | | 11/1997 | Yaver et al. |
| 5,715,093 A | | 2/1998 | Schierbeek et al. |
| 5,724,187 A | | 3/1998 | Varaprasad et al. |
| 5,760,962 A | | 6/1998 | Schofield et al. |
| 5,796,094 A | | 8/1998 | Schofield et al. |
| 5,877,897 A | | 3/1999 | Schofield et al. |
| 5,910,854 A | | 6/1999 | Varaprasad et al. |
| 5,984,482 A | | 11/1999 | Rumsey et al. |
| 6,002,511 A | | 12/1999 | Varaprasad et al. |
| 6,097,023 A | | 8/2000 | Schofield et al. |
| 6,139,172 A | | 10/2000 | Bos et al. |
| 6,154,306 A | | 11/2000 | Varaprasad et al. |
| 6,178,034 B1 | | 1/2001 | Allemand et al. |
| 6,201,642 B1 | | 3/2001 | Bos |
| 6,222,447 B1 | | 4/2001 | Schofield et al. |
| 6,318,870 B1 | | 11/2001 | Spooner et al. |
| 6,320,176 B1 | | 11/2001 | Schofield et al. |
| 6,326,613 B1 | | 12/2001 | Heslin et al. |
| 6,396,397 B1 | | 5/2002 | Bos et al. |
| 6,420,036 B1 | | 7/2002 | Varaprasad et al. |
| 6,439,755 B1 | | 8/2002 | Fant, Jr. et al. |
| 6,445,287 B1 | | 9/2002 | Schofield et al. |
| 6,498,620 B2 | | 12/2002 | Schofield et al. |
| 6,501,387 B2 | | 12/2002 | Skiver et al. |
| 6,559,435 B2 | | 5/2003 | Schofield et al. |
| 6,590,719 B2 | | 7/2003 | Bos |
| 6,598,980 B2 | | 7/2003 | Marusawa et al. |
| 6,690,268 B2 | | 2/2004 | Schofield et al. |
| 6,717,610 B1 | | 4/2004 | Bos et al. |
| 6,757,109 B2 | | 6/2004 | Bos |
| 6,806,452 B2 | | 10/2004 | Bos et al. |
| 6,822,563 B2 | | 11/2004 | Bos et al. |
| 6,824,281 B2 | | 11/2004 | Schofield et al. |
| 6,831,261 B2 | | 12/2004 | Schofield et al. |
| 6,922,292 B2 | | 7/2005 | Bos |
| 6,946,978 B2 | | 9/2005 | Schofield |
| 7,004,606 B2 | | 2/2006 | Schofield |
| 7,038,577 B2 | | 5/2006 | Pawlicki et al. |
| 7,184,190 B2 | | 2/2007 | McCabe et al. |
| 7,195,381 B2 | | 3/2007 | Lynam et al. |
| 7,249,860 B2 | | 7/2007 | Kulas et al. |
| 7,255,451 B2 | | 8/2007 | McCabe et al. |
| 7,274,501 B2 | | 9/2007 | McCabe et al. |
| 7,289,037 B2 | | 10/2007 | Uken et al. |
| 7,338,177 B2 | | 3/2008 | Lynam |
| 7,360,932 B2 | | 4/2008 | Uken et al. |
| 7,480,149 B2 | | 1/2009 | DeWard et al. |
| 7,626,749 B2 | | 12/2009 | Baur et al. |
| 7,720,580 B2 | | 5/2010 | Higgins-Luthman |
| 7,855,755 B2 | | 12/2010 | Weller et al. |
| 7,914,188 B2 | | 3/2011 | DeLine et al. |
| 8,044,777 B2 | * | 10/2011 | Drummond ............. B60R 1/088 |
| | | | 348/148 |
| 8,049,640 B2 | | 11/2011 | Uken et al. |
| 8,154,418 B2 | | 4/2012 | Peterson et al. |
| 8,256,821 B2 | | 9/2012 | Lawlor et al. |
| 8,277,059 B2 | | 10/2012 | McCabe et al. |
| 8,508,831 B2 | | 8/2013 | De Wind et al. |
| 8,529,108 B2 | | 9/2013 | Uken et al. |
| 8,730,553 B2 | | 5/2014 | De Wind et al. |
| 9,346,403 B2 | | 5/2016 | Uken et al. |
| 9,598,016 B2 | | 3/2017 | Blank et al. |
| 10,948,798 B2 | | 3/2021 | Lynam et al. |
| 10,967,796 B2 | | 4/2021 | Uken et al. |
| 11,427,127 B2 | * | 8/2022 | Uken ...................... B60R 1/088 |
| 11,634,078 B2 | * | 4/2023 | Uken ........................ B60R 1/04 |
| | | | 348/148 |
| 11,932,169 B2 | | 3/2024 | Uken et al. |
| 12,179,668 B2 | | 12/2024 | Uken et al. |
| 2001/0022550 A1 | | 9/2001 | Steffel |
| 2002/0003571 A1 | | 1/2002 | Schofield et al. |
| 2002/0158805 A1 | * | 10/2002 | Turnbull ............... B60C 23/061 |
| | | | 343/700 MS |
| 2003/0025793 A1 | | 2/2003 | McMahon |
| 2003/0117728 A1 | | 6/2003 | Hutzel et al. |
| 2004/0032676 A1 | * | 2/2004 | Drummond ............. G02B 27/01 |
| | | | 359/877 |
| 2004/0196179 A1 | | 10/2004 | Turnbull |
| 2004/0207940 A1 | * | 10/2004 | Carter .................... G02B 7/182 |
| | | | 359/879 |

(56)     References Cited

U.S. PATENT DOCUMENTS

| | | | |
|---|---|---|---|
| 2008/0011733 A1* | 1/2008 | Rawlings | B60R 1/088 |
| | | | 219/219 |
| 2009/0097097 A1 | 4/2009 | Desmond et al. | |
| 2009/0295181 A1 | 12/2009 | Lawlor et al. | |
| 2011/0188122 A1* | 8/2011 | Habibi | B60R 1/04 |
| | | | 359/604 |
| 2012/0026571 A1 | 2/2012 | Uken et al. | |
| 2012/0105641 A1 | 5/2012 | Schofield et al. | |
| 2012/0236388 A1* | 9/2012 | De Wind | G02F 1/13338 |
| | | | 359/267 |
| 2013/0088884 A1 | 4/2013 | Brummel et al. | |
| 2013/0107563 A1 | 5/2013 | McCabe et al. | |
| 2014/0002239 A1 | 1/2014 | Rayner | |
| 2014/0022390 A1 | 1/2014 | Blank et al. | |
| 2014/0160284 A1 | 6/2014 | Achenbach et al. | |
| 2014/0209790 A1 | 7/2014 | Turnbull et al. | |
| 2014/0226012 A1 | 8/2014 | Achenbach | |
| 2014/0268281 A1* | 9/2014 | Nelson | B60R 1/088 |
| | | | 359/267 |
| 2014/0293169 A1 | 10/2014 | Uken et al. | |
| 2014/0313563 A1 | 10/2014 | Uken et al. | |
| 2015/0015713 A1 | 1/2015 | Wang et al. | |
| 2015/0097955 A1 | 4/2015 | De Wind et al. | |
| 2015/0140146 A1 | 5/2015 | Habibi | |
| 2015/0251605 A1 | 9/2015 | Uken et al. | |
| 2015/0283945 A1 | 10/2015 | Krebs et al. | |
| 2015/0327398 A1 | 11/2015 | Achenbach et al. | |
| 2015/0334354 A1 | 11/2015 | Uken et al. | |
| 2016/0009226 A1 | 1/2016 | Krebs | |
| 2016/0023606 A1 | 1/2016 | Krebs | |
| 2016/0375833 A1 | 12/2016 | Larson et al. | |
| 2019/0047475 A1 | 2/2019 | Uken et al. | |
| 2020/0254932 A1 | 8/2020 | De Wind et al. | |

OTHER PUBLICATIONS

Federal Motor vehicle Safety Standards: Rear Visibility; Federal Register; vol. 79, No. 66; Apr. 7, 2014; pp. 19178-19250 (Year 2014).

* cited by examiner

BACKUP CAMERA DETERMINES WHEN ANY AUTO-DIMMING MIRROR INDEPENDENTLY COLORS OR DIMS

ECU
• ELECTRONIC CONTROL UNIT (ECU)
• BACKUP CAMERA COMMUNICATES WITH ECU OVER CAN BUS OR LIN BUS OR I2C ETC.
• ECU CAN DRIVE THE INSIDE AUTO-DIMMING MIRROR INDEPENDENTLY OR ANOTHER ELECTRONIC CONTROL UNIT CAN

DMU
• DOOR MODULE UNIT (DMU)
• ECU COMMUNICATES WITH DMU OVER CAN BUS OR LIN BUS OR I2C ETC.
• DMUs DRIVE THE DRIVER SIDE AND PASSENGER SIDE OUTSIDE AUTO-DIMMING MIRRORS INDEPENDENTLY

AUTO-DIMMING MIRROR
THIN-FINITY

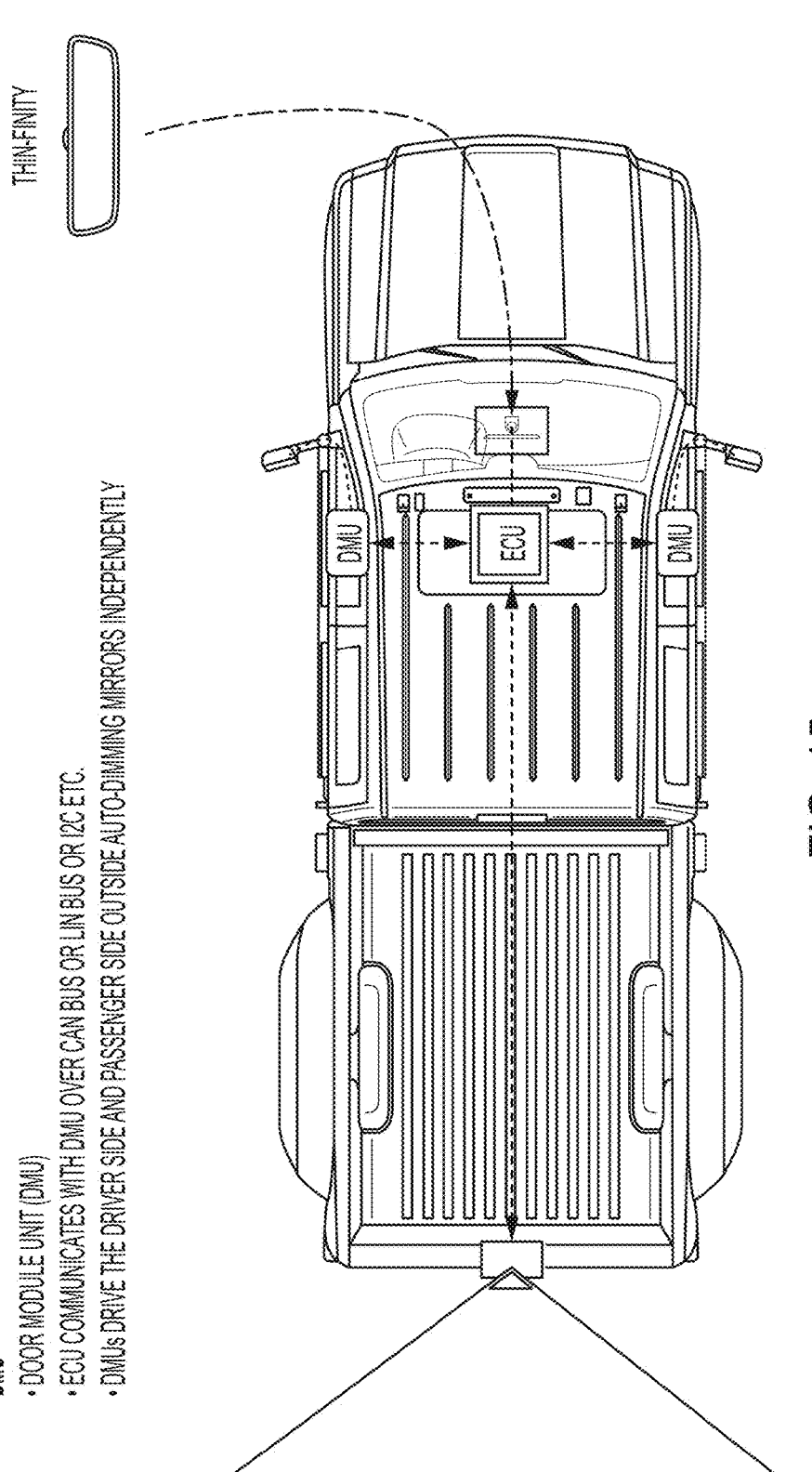

FIG. 15

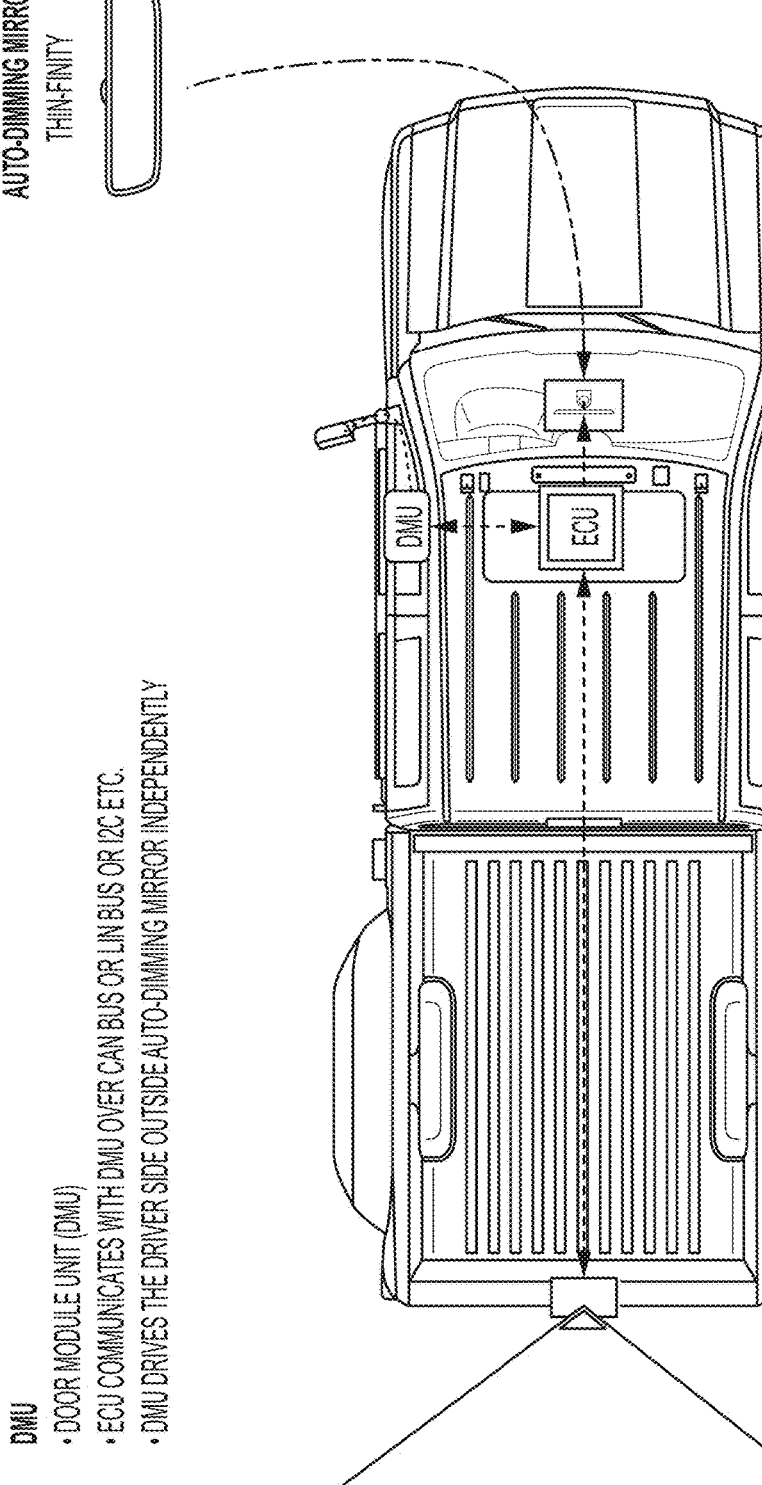

BACKUP CAMERA DETERMINES WHEN ANY AUTO-DIMMING MIRROR INDEPENDENTLY COLORS OR DIMS

ECU

• ELECTRONIC CONTROL UNIT (ECU)

• BACKUP CAMERA COMMUNICATES WITH ECU OVER CAN BUS OR LIN BUS OR I2C ETC.

• ECU CAN DRIVE THE INSIDE AUTO-DIMMING MIRROR INDEPENDENTLY OR ANOTHER ELECTRONIC CONTROL UNIT CAN

DMU

• DOOR MODULE UNIT (DMU)

• ECU COMMUNICATES WITH DMU OVER CAN BUS OR LIN BUS OR I2C ETC.

• DMU DRIVES THE DRIVER SIDE OUTSIDE AUTO-DIMMING MIRROR INDEPENDENTLY

AUTO-DIMMING MIRROR
THIN-FINITY

FIG. 16

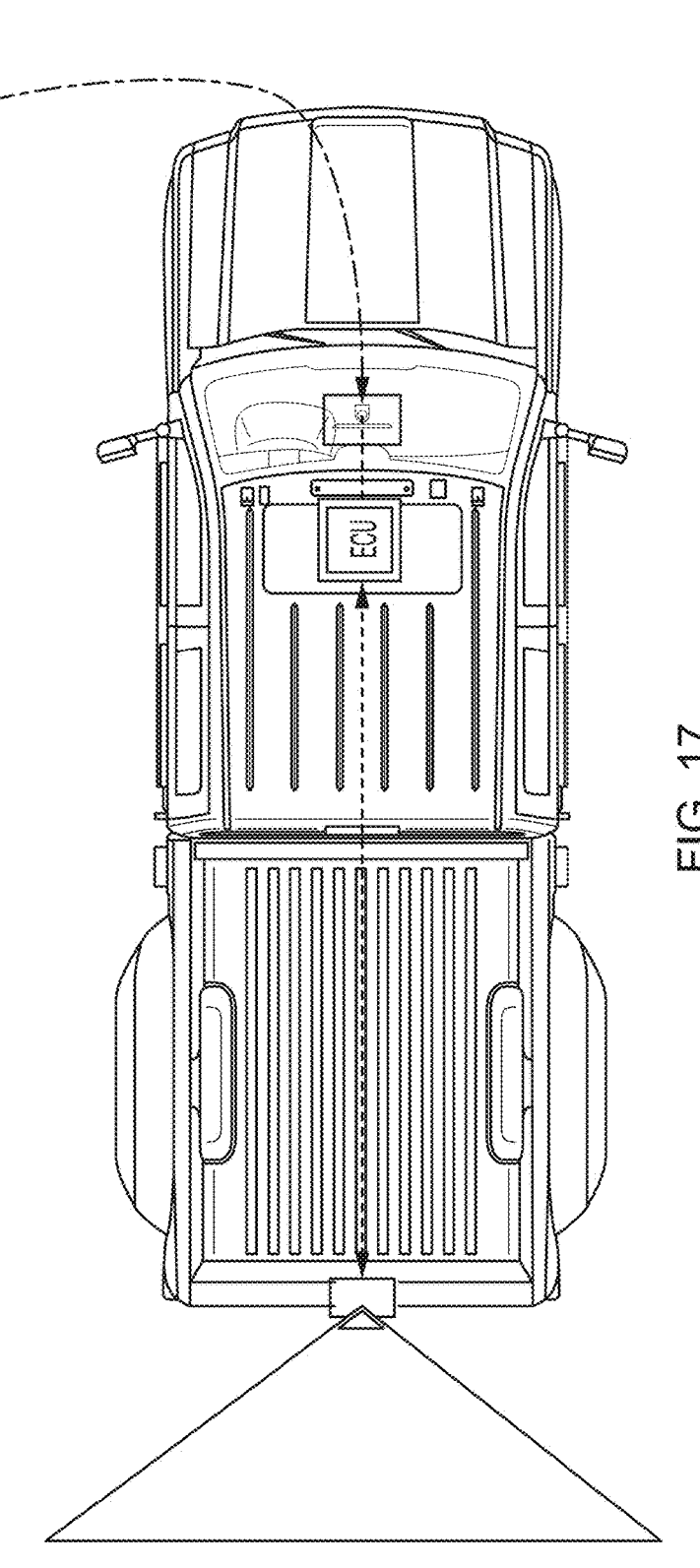

BACKUP CAMERA DETERMINES WHEN ANY AUTO-DIMMING MIRROR INDEPENDENTLY COLORS OR DIMS

ECU
• ELECTRONIC CONTROL UNIT (ECU)
• BACKUP CAMERA COMMUNICATES WITH ECU OVER CAN BUS OR LIN BUS OR I2C ETC.
• ECU CAN DRIVE THE INSIDE AUTO-DIMMING MIRROR INDEPENDENTLY OR ANOTHER ELECTRONIC CONTROL UNIT CAN

DMU
• DOOR MODULE UNIT (DMU)
• ECU COMMUNICATES WITH DMU OVER CAN BUS OR LIN BUS OR I2C ETC.

AUTO-DIMMING MIRROR
THIN-FINITY

FIG. 17

BACKUP CAMERA DETERMINES WHEN ANY AUTO-DIMMING MIRROR INDEPENDENTLY COLORS OR DIMS

ECU
• ELECTRONIC CONTROL UNIT (ECU)
• BACKUP CAMERA COMMUNICATES WITH ECU OVER CAN BUS OR LIN BUS OR I2C ETC.

DMU
• DOOR MODULE UNIT (DMU)
• ECU COMMUNICATES WITH DMU OVER CAN BUS OR LIN BUS OR I2C ETC.
• DMU DRIVES THE DRIVER SIDE AND PASSENGER SIDE OUTSIDE AUTO-DIMMING MIRROR INDEPENDENTLY

STANDARD PRISMATIC MIRROR
USED IN PLACE OF AN AUTO-DIMMING MIRROR

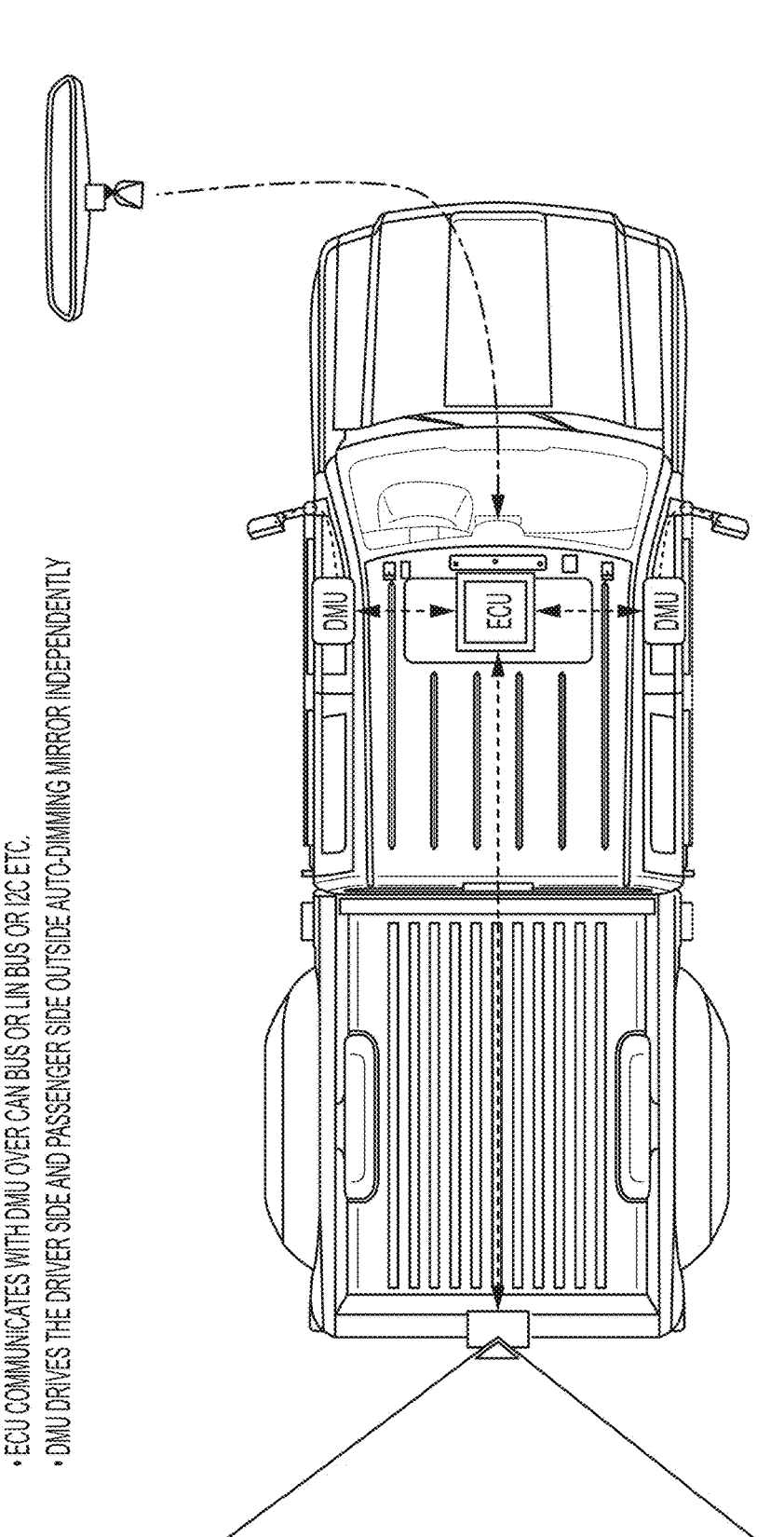

FIG. 18

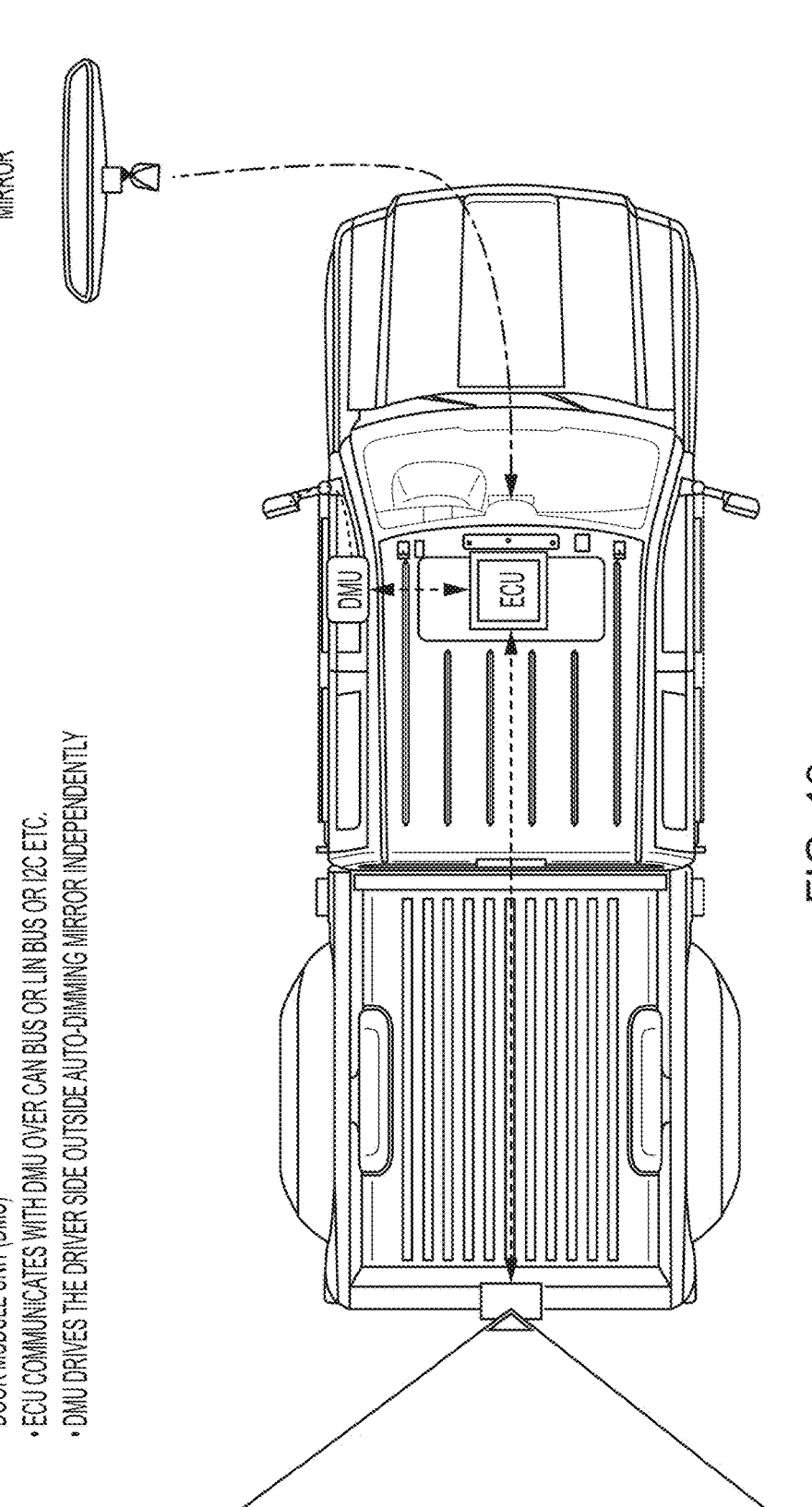

BACKUP CAMERA DETERMINES WHEN ANY AUTO-DIMMING MIRROR INDEPENDENTLY COLORS OR DIMS

ECU
• ELECTRONIC CONTROL UNIT (ECU)
• BACKUP CAMERA COMMUNICATES WITH ECU OVER CAN BUS OR LIN BUS OR I2C ETC.

DMU
• DOOR MODULE UNIT (DMU)
• ECU COMMUNICATES WITH DMU OVER CAN BUS OR LIN BUS OR I2C ETC.
• DMU DRIVES THE DRIVER SIDE OUTSIDE AUTO-DIMMING MIRROR INDEPENDENTLY

STANDARD PRISMATIC MIRROR
USED IN PLACE OF AN AUTO-DIMMING
MIRROR

FIG. 19

BACKUP CAMERA + SURROUNDVUE CAMERAS + FORWARD FACING CAMERAS + CLEARVIEW CAMERA CAMERA PLUS MORE CAMERAS FOR CONTROLLING AUTO-DIMMING MIRRORS INDEPENDENTLY

ECU
- ELECTRONIC CONTROL UNIT (ECU)
- CAMERAS CAN COMMUNICATES WITH ECU OVER CAN BUS OR LIN BUS OR I2C ETC.
- ECU CAN DRIVE THE INSIDE AUTO-DIMMING MIRROR INDEPENDENTLY OR ANOTHER ELECTRONIC CONTROL UNIT CAN

DMU
- DOOR MODULE UNIT (DMU)
- ECU COMMUNICATES WITH DMU OVER CAN BUS OR LIN BUS OR I2C ETC.
- DMUs DRIVE THE OUTSIDE AUTO-DIMMING MIRRORS INDEPENDENTLY OR ANOTHER ELECTRONIC CONTROL UNIT CAN

CAMERAS
- BACKUP CAMERA
- BED CAMERA
- CLEARVIEW CAMERA
- OUTSIDE MIRROR CAMERAS
- FORWARD FACING CAMERAS
- GRILL CAMERA

AUTO-DIMMING MIRROR
THIN-FINITY

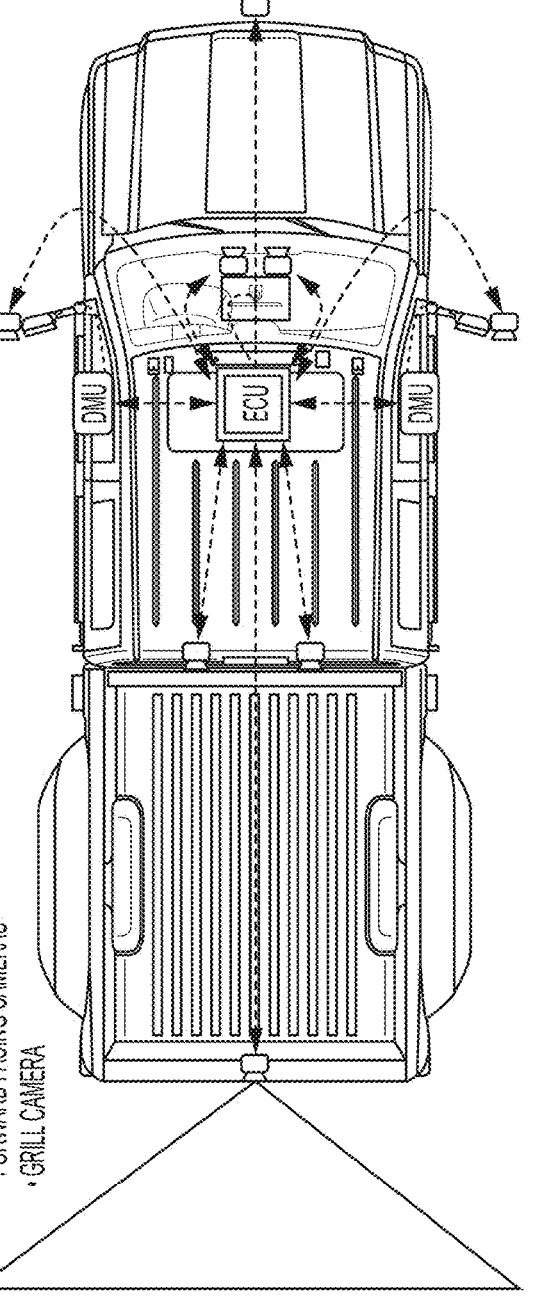

FIG. 20

VEHICULAR REARVIEW MIRROR CONTROL SYSTEM

CROSS REFERENCE TO RELATED APPLICATIONS

The present application is a continuation of U.S. patent application Ser. No. 18/607,618, filed Mar. 18, 2024, now U.S. Pat. No. 12,179,668, which is a continuation of U.S. patent application Ser. No. 18/305,477, filed Apr. 24, 2023, now U.S. Pat. No. 11,932,169, which is a continuation of U.S. patent application Ser. No. 17/822,834, filed Aug. 29, 2022, now U.S. Pat. No. 11,634,078, which is a continuation of U.S. patent application Ser. No. 17/301,476, filed Apr. 5, 2021, now U.S. Pat. No. 11,427,127, which is a continuation of U.S. patent application Ser. No. 16/164,895, filed Oct. 19, 2018, now U.S. Pat. No. 10,967,796, which claims the filing benefits of U.S. provisional applications, Ser. No. 62/595, 169, filed Dec. 6, 2017, Ser. No. 62/587,651, filed Nov. 17, 2017, Ser. No. 62/583,742, filed Nov. 9, 2017, and Ser. No. 62/575,649, filed Oct. 23, 2017, which are all hereby incorporated herein by reference in their entireties. And U.S. patent application Ser. No. 16/164,895 is a continuation-in-part of U.S. patent application Ser. No. 14/712,200, filed May 14, 2015, which claims the filing benefits of U.S. provisional applications, Ser. No. 62/032,036, filed Aug. 1, 2014, Ser. No. 62/006,392, filed Jun. 2, 2014, Ser. No. 62/001,350, filed May 21, 2014, and Ser. No. 61/993,333, filed May 15, 2014, which are hereby incorporated herein by reference in their entireties. And U.S. patent application Ser. No. 17/301,476 is a continuation-in-part of U.S. patent application Ser. No. 17/249,685, filed Mar. 10, 2021, which is a division of U.S. patent application Ser. No. 16/098,177, filed Nov. 1, 2018, now U.S. Pat. No. 10,948,798, which is a 371 national phase filing of PCT Application No. PCT/ IB2017/052542, filed May 2, 2017, which claims the filing benefits of U.S. provisional applications, Ser. No. 62/471, 491, filed Mar. 15, 2017, Ser. No. 62/371,256, filed Aug. 5, 2016, Ser. No. 62/344,527, filed Jun. 2, 2016, Ser. No. 62/340,679, filed May 24, 2016, Ser. No. 62/338,124, filed May 18, 2016, and Ser. No. 62/330,556, filed May 2, 2016.

FIELD OF THE INVENTION

The present invention relates generally to the field of mirror elements for use in rearview mirror assemblies and visors for vehicles.

BACKGROUND OF THE INVENTION

It is known to provide a mirror reflective element and a bezel for an interior or exterior rearview mirror assembly of a vehicle. The interior mirror reflective element is adjustably mounted to an interior portion of a vehicle, such as via a double ball pivot or joint mounting configuration where the mirror casing and reflective element are adjusted relative to the interior portion of a vehicle by pivotal movement about the double ball pivot configuration.

SUMMARY OF THE INVENTION

The present invention provides an interior rearview mirror assembly that has a mirror reflective element adjustably mounted at an interior portion of a vehicle and adjustable to adjust the driver's rearward view, such as through a rear window of the vehicle, via the driver viewing the mirror reflective element. The interior rearview mirror assembly includes a reduced thickness or thin mirror head pivotally mounted or attached at a mirror mount that is configured to attach at an interior portion of a vehicle equipped with the interior rearview mirror assembly. The mirror head comprises a reduced profile mirror casing having a thickness between a front generally planar surface of the mirror reflective element and a rear surface of the mirror casing, and wherein the thickness is less than about 25 mm. The mirror head has a socket element at a central region of the mirror casing.

The mirror reflective element may comprise an electrically variable reflectance mirror reflective element (such as an electro-optic mirror reflective element, such as an electrochromic mirror reflective element) and wiring may pass through the pivot joint at the mirror head and mounting stay to electrically connect the electrically conductive coatings of the mirror reflective element to a vehicle wire harness. The mirror head may include an attachment plate with electrically conductive elements insert molded therein so as to provide electrical connection between a connector of a wire that electrically connects to the vehicle wire harness and respective electrically conductive coatings of the variable reflectance mirror reflective element.

The mirror may comprise an electro-optic (such as electrochromic) auto-dimming mirror, and the dimming control of the mirror may be responsive to a rear backup camera. The rear backup camera may communicate a signal to an electronic control unit (ECU) of the vehicle, which then communicates a dimming control signal to the interior auto-dimming mirror and a dimming control signal to one or more exterior auto-dimming mirrors, whereby each auto-dimming mirror is independently dimmed or colored responsive to the rear backup camera, with the degree of dimming or coloring of each mirror being responsive at least in part to the intensity and location of glare light rearward of the vehicle as determined via processing of data captured by the rear backup camera.

These and other objects, advantages, purposes and features of the present invention will become apparent upon review of the following specification in conjunction with the drawings.

BRIEF DESCRIPTION OF THE DRAWINGS

FIG. 15 is a plan view of a vehicle having an interior auto-dimming mirror and driver-side and passenger-side auto-dimming mirrors that are independently dimmed responsive to image data captured by a rear backup camera of the vehicle;

FIG. 16 is a plan view of a vehicle having an interior auto-dimming mirror and a driver-side auto-dimming mirror that are independently dimmed responsive to image data captured by a rear backup camera of the vehicle;

FIG. 17 is a plan view of a vehicle having an interior auto-dimming mirror that is dimmed responsive to image data captured by a rear backup camera of the vehicle;

FIG. 18 is a plan view of a vehicle having an interior prismatic mirror and having driver-side and passenger-side auto-dimming mirrors that are independently dimmed responsive to image data captured by a rear backup camera of the vehicle;

FIG. 19 is a plan view of a vehicle having an interior prismatic mirror and having a driver-side auto-dimming mirror that is dimmed responsive to image data captured by a rear backup camera of the vehicle; and FIG. 20 is a plan view of a vehicle having an interior auto-dimming mirror and a driver-side auto-dimming mirror and a passenger-side auto-dimming mirror that are independently dimmed responsive to image data captured by at least a rear backup camera of a surround view vision system of the vehicle.

DESCRIPTION OF THE PREFERRED EMBODIMENTS

Figure 1:
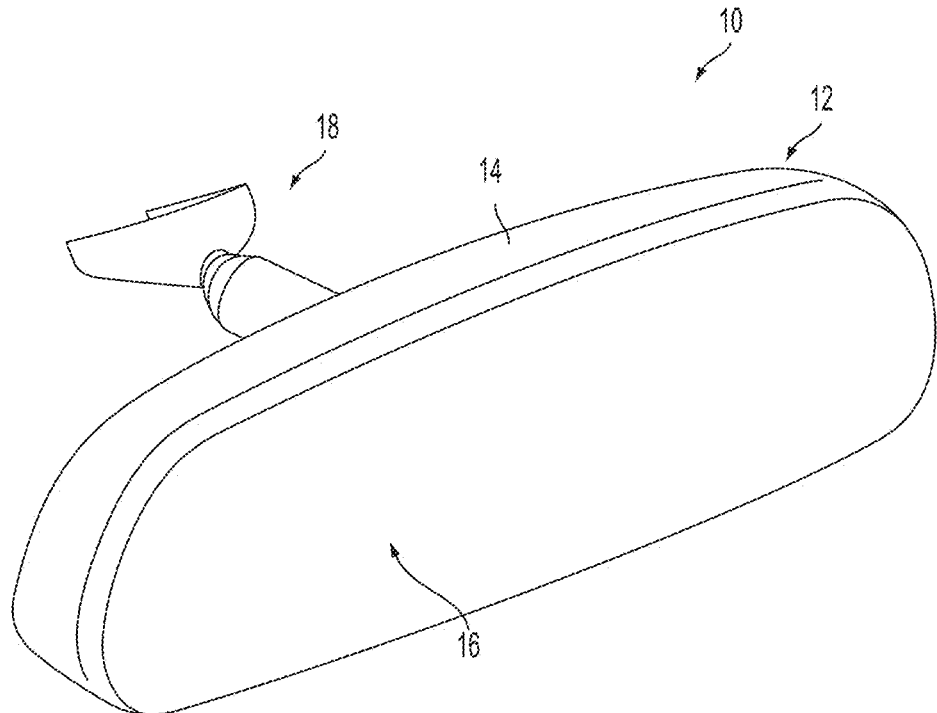
FIG. 1 is a perspective view of an interior rearview mirror assembly in accordance with the present invention.

Referring now to the drawings and the illustrative embodiments depicted therein, an interior rearview mirror assembly 10 for a vehicle includes a mirror head 12 having a casing 14 and a reflective element 16 positioned at a front portion of the casing 14 (FIG. 1). In the illustrated embodiment, mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 18. The mirror reflective element may comprise a prismatic reflective element or a variable reflectance mirror reflective element that varies its reflectance responsive to electrical current applied to conductive coatings or layers of the reflective element.

The interior rearview mirror assembly of the present invention provides a thin or substantially reduced size mirror head or mirror casing, such as for an electro-optic (such as electrochromic or the like) reflective element or such as for a prismatic reflective element. For example, and such as shown in FIGS. 2-6, the mirror head 12 of the mirror assembly 10 has a reduced or minimized housing depth. The mirror housing 14 and reflective element 16 thus may have a thin construction. Thus, the mirror head of the present invention may have a reduced thickness dimension (the dimension between the front generally planar surface of the reflective element and the rear surface of the mirror casing at a generally central region of the mirror head), preferably less than about 25 mm, such as less than about 20 mm or less than about 15 mm or less than about 10 mm, and may have a casing that has radiused or tapered perimeter edge regions. The mirror assembly may utilize aspects of the mirror assemblies described in U.S. Publication No. US-2015-0334354, which is hereby incorporated herein by reference in its entirety.

The mirror head 12 is pivotally mounted at a mounting structure or stay 18, which is configured to mount at an interior structure of a vehicle (such as at a header of a vehicle or such as at a windshield of a vehicle) via an attaching structure 20. The mirror head 12 includes a socket 22 at rear of the mirror casing 14, while the mounting structure 18 includes a ball member, such that the socket 22 pivotally receives the ball member to pivotally attach the mirror head at the mounting structure or stay. The socket element 22 may comprise a separate piece that snap attaches or is otherwise fastened at the rear of the reflective element or backing plate or mirror casing, or optionally may be integrally molded with the backing plate or mirror casing, or optionally may be insert molded in the backing plate or mirror casing. The ball member may comprise a metallic or plastic ball member and may be integrally molded with the mirror stay or may be insert molded at the mirror stay.

Figure 3:
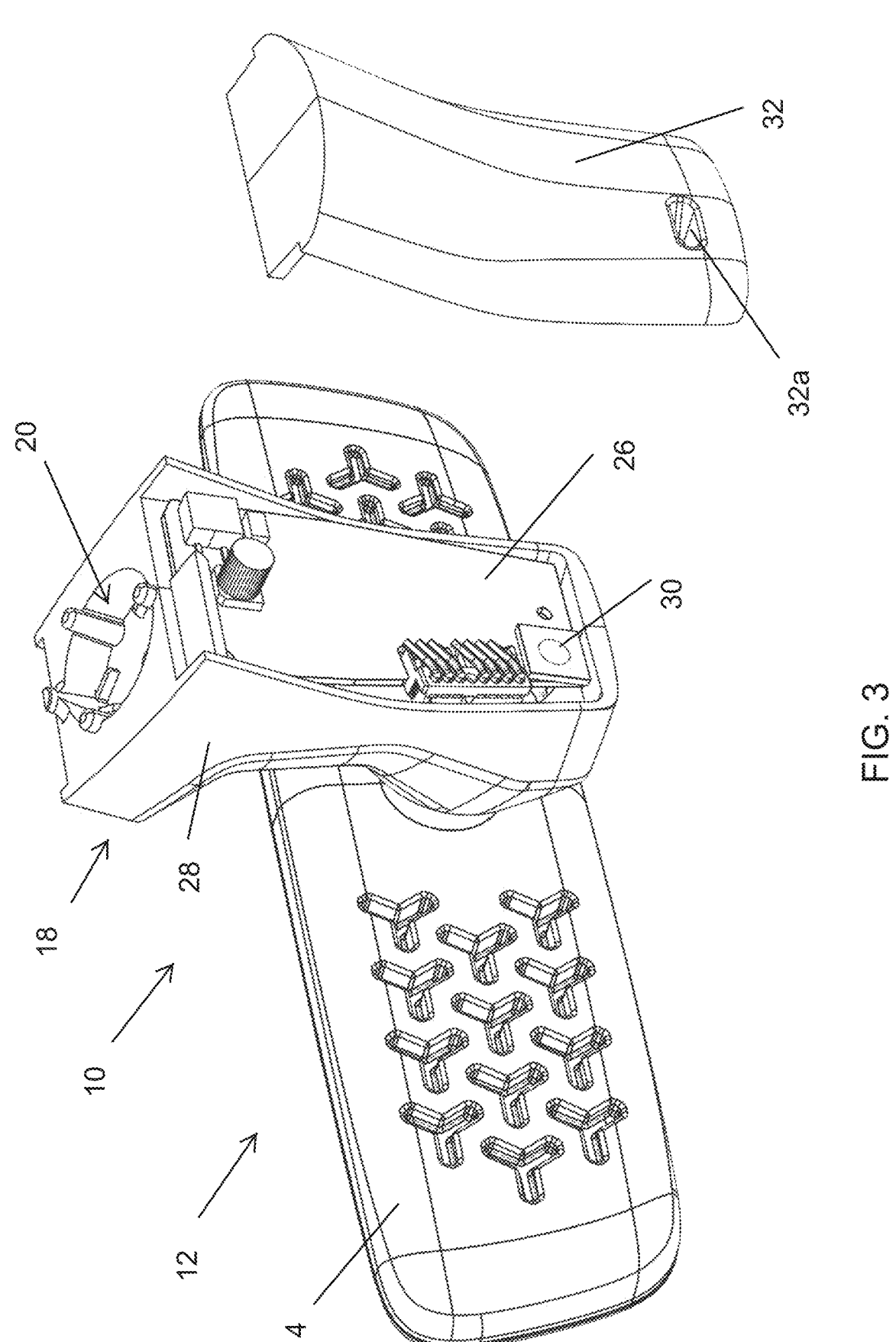
FIG. 3 is a partially exploded perspective view of the thin interior rearview mirror assembly of FIG. 2, with the cover of the mounting structure removed to show the circuit board therein.
Figure 4:
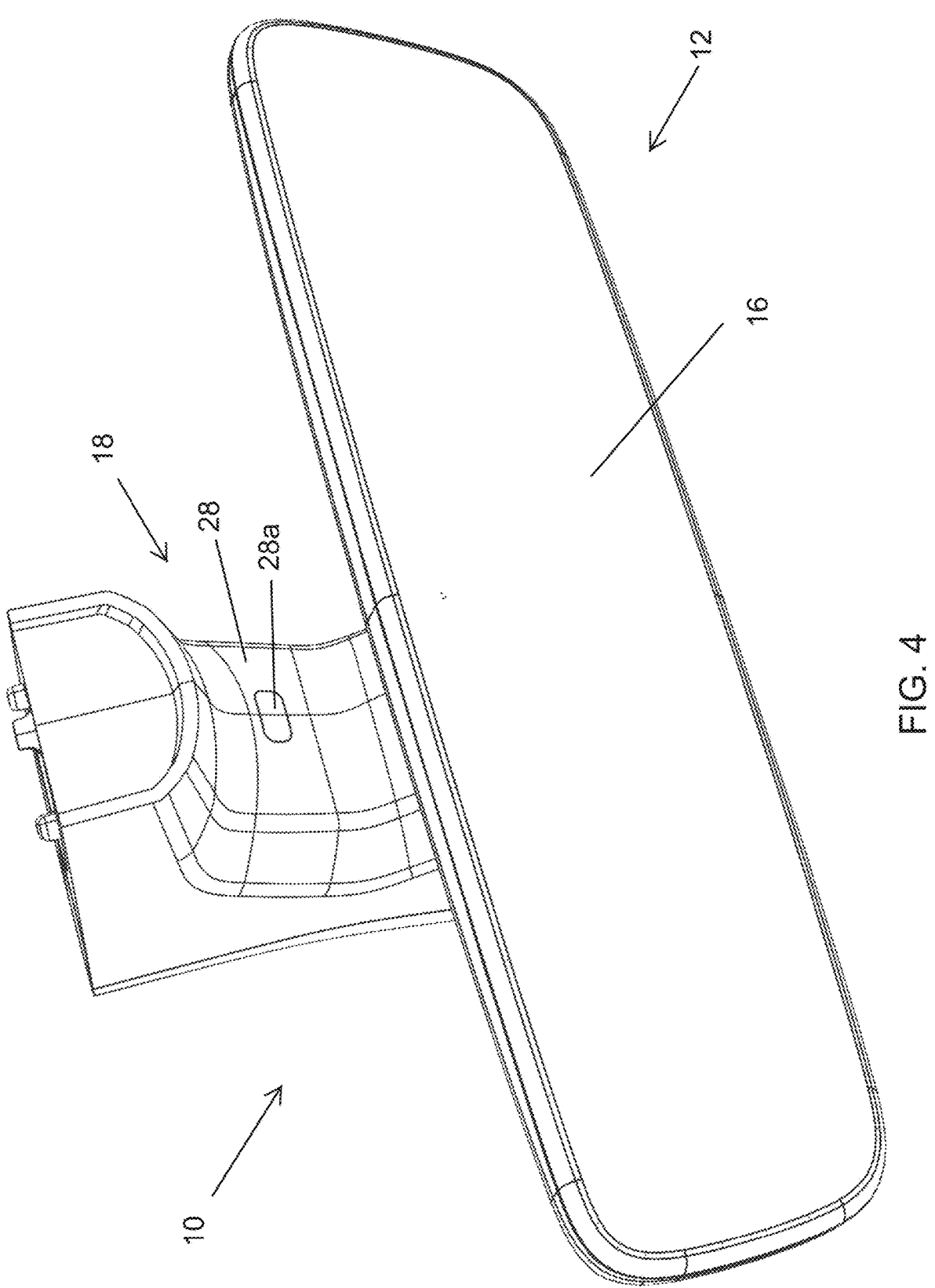
FIG. 4 is a front perspective view of the thin interior rearview mirror assembly of FIG. 2.

As shown in FIG. 3, the thin mirror assembly 10 may have circuitry or a circuit element or circuit board 26 at or in the mounting arm or mounting structure or stay 18 of the mirror assembly (such as housed within a stay housing or casing 28), whereby a rearward viewing sensor or camera may be disposed at the rear of the reflective element (and optionally a forward viewing sensor or camera may be disposed at the rear of the reflective element for sensing forward of the reflective element and through the windshield of the vehicle equipped with the mirror assembly). For example, a forward viewing sensor 30 (FIG. 3) may be disposed at the circuit element 26 and may view forwardly through a cover 32 of the mounting structure or stay 18, such as through an aperture 32*a* formed through the cover 32, and/or a rearward viewing sensor may be disposed at the circuit element 26 and may view forwardly through the housing or casing 28 of the mounting structure or stay 18, such as through an aperture 28*a* formed through the housing 28 (FIG. 4). The circuitry may electrically connect to a wiring harness of the vehicle and may power the sensors. The circuitry may also electrically connect to terminals of the electrochromic mirror reflective element or cell via one or more wires disposed within the mirror head and at the rear of the reflective element, with the wires passing through a passageway formed through the stay and socket and ball member.

Figure 2:
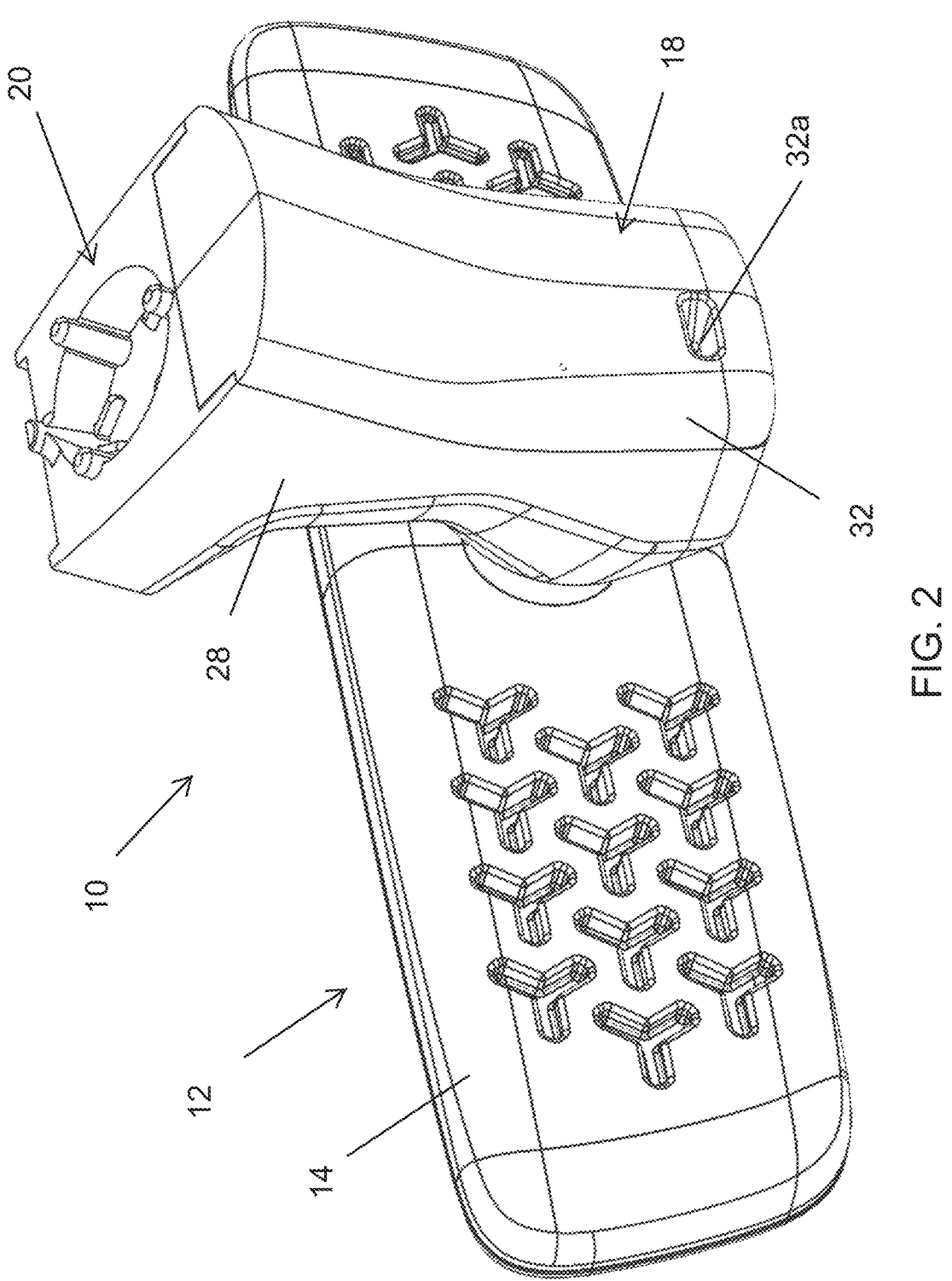
FIG. 2 is a perspective view of a thin interior rearview mirror assembly in accordance with the present invention.

Thus, and such as shown in FIGS. 2-4, an interior rearview mirror assembly of the present invention may have an electrochromic reflective element with a circuit board and sensors disposed in a single-ball mirror mounting stay or structure, which is configured to attach at an interior structure of the vehicle. The sensors include a forward facing ambient light sensor that views through an aperture in the mounting structure and forwardly through the windshield of the vehicle when the mirror assembly is mounted in the vehicle. The sensors also include a rearward facing glare light sensor that views through an aperture in the mounting structure and views rearward over the reflective element and towards the rear window of the vehicle (so as to detect glare light emanating from vehicles following the subject or equipped vehicle). The sensors are disposed at a circuit element or circuit board disposed in the mounting structure, such as in a similar manner as described above.

As can be seen in FIGS. 2-4, the apertures are in the mount or stay, with the glare aperture established just above (or optionally below) the mirror reflective element edge so as to view rearward above or below the reflective element to capture or view glare lighting. The aperture in the mirror mount that faces forward allows for viewing forward by the ambient light sensor for sensing ambient light. The present invention thus provides for a much thinner packaging of the mirror head, and allows for a reduction of a wiring harness by allowing for a direct connection to the PCB from the vehicle harness (such as at the headliner of the vehicle or the like), which is also a cost reduction feature. The mirror reflective element thus is simplified, thinner and lighter than previous mirror elements, including previous frameless mirror elements, and provides for creative styling to enhance the mirror's appearance.

Figures 5, 5A:
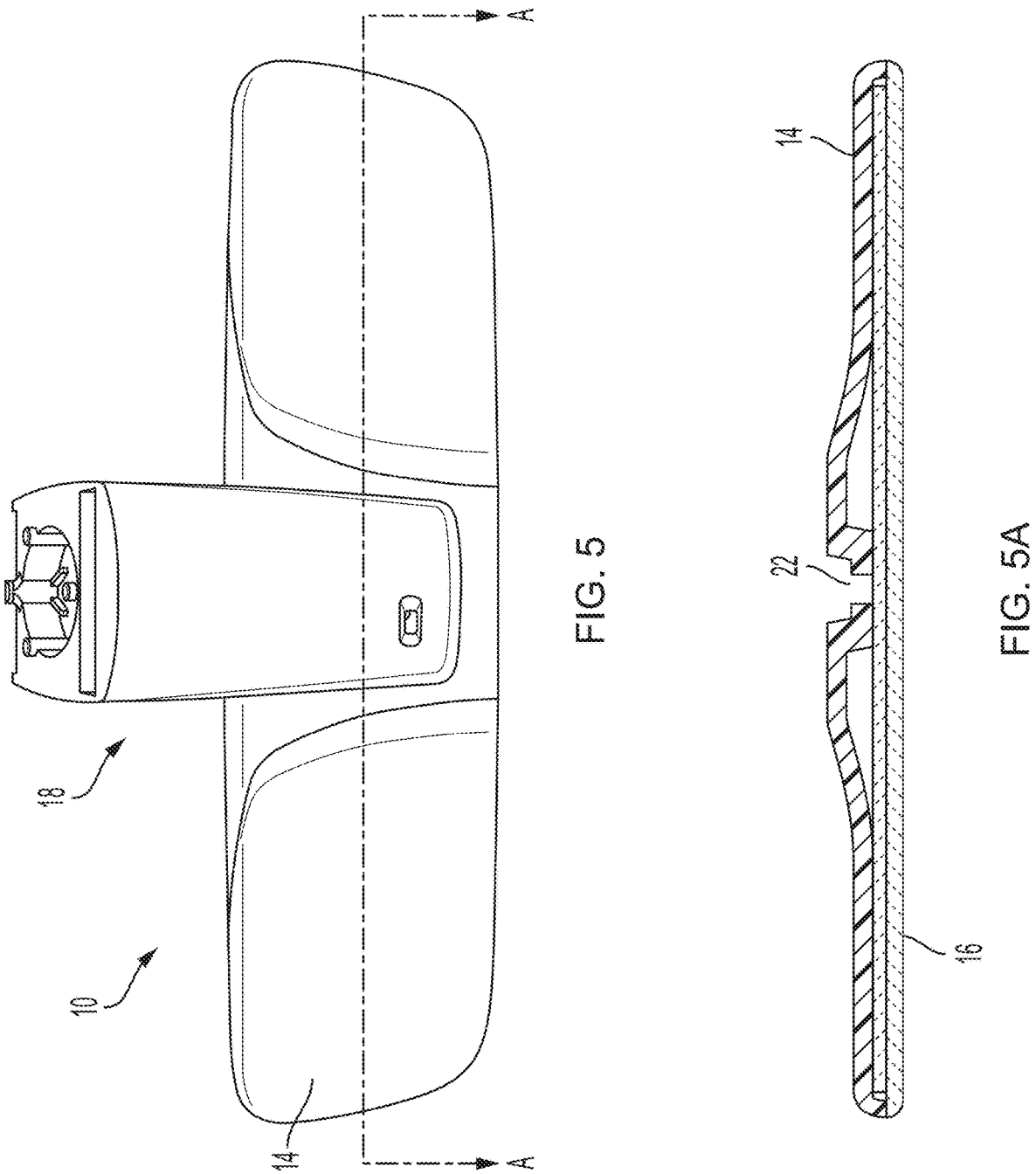
FIG. 5 is a rear elevation of the thin interior rearview mirror assembly.
FIG. 5A is a sectional view of the thin interior rearview mirror assembly taken along the line A-A in FIG. 5.
Figure 6:
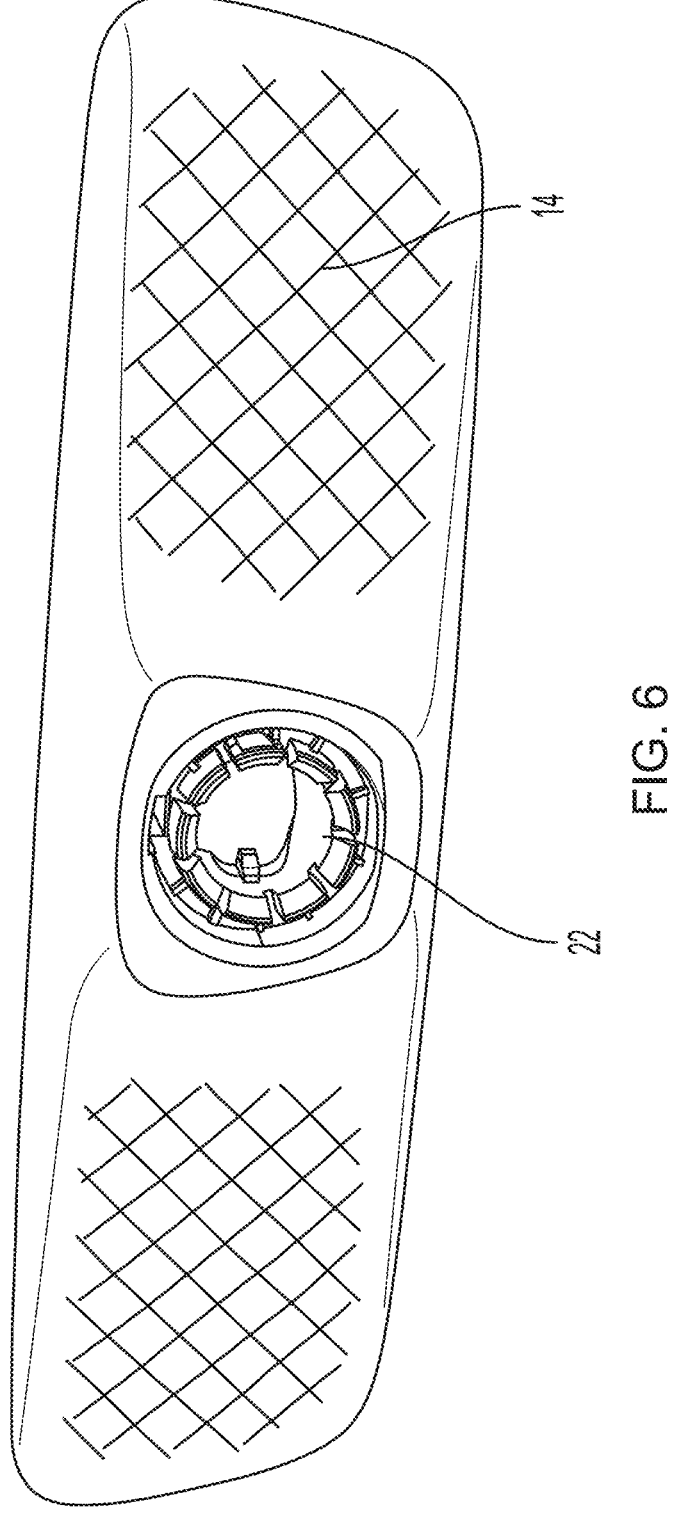
FIG. 6 is a perspective view of the rear of the mirror housing, showing the socket element disposed thereat.

As shown in FIGS. 5, 5A and 6, the mirror housing or casing comprises a cover element that has side regions that are generally parallel to the rear of the reflective element, such that the reflective element may be adhesively attached directly to the mirror housing. As shown in FIG. 5A, the center region of the mirror housing may also provide an attaching surface at which the center region of the mirror reflective element is adhesively attached. In the illustrated embodiment, the housing partially receives the reflective element therein, such that a perimeter portion of the housing circumscribes the rear glass substrate of the electro-optic reflective element, with the front glass substrate having a rounded or curved perimeter edge to provide a rounded transition from a planar front or first surface of the reflective element to a side surface of the housing. Optionally, the housing may extend over and circumscribe the perimeter edge of the front substrate, whereby the housing may provide a rounded or curved perimeter region to provide a rounded transition from the planar front or first surface of the reflective element to the side surface of the housing.

As shown in FIGS. 5, 5A and 6, the center region of the mirror housing 14 is raised so as to house the socket element 22. The socket element 22 may be integrated into the mirror head. For example, the socket may be attached at the housing and the reflective element may be attached at the housing (such as by attaching the socket element at the housing before the reflective element is adhered to the housing, such that the socket element is retained in a receiving portion of the housing.

Optionally, the reflective element may be attached at an attachment plate and the socket may be attached at the opposite side of the attachment plate, with the housing attaching at the attachment plate. For example, and with reference to FIG. 7, an attachment plate 34 may comprise a generally planar plate structure with bosses or threaded stanchions 36 at which the socket element may be attached (such as via a plurality of fasteners). Electrical connection to the electro-optic reflective element may be made via electrically conductive elements 38 disposed at or insert molded in the attachment plate. In the illustrated embodiment, the electrically conductive elements are insert molded at the attaching plate with connecting terminals 38a extending or protruding from the attaching plate for electrical connection to an electrical connector of a wire 40 (that may be routed through the ball member and socket for electrical connection of the conductive elements to a vehicle wire harness or the like) and with cell connecting terminals 38b disposed at recesses 34a of the attaching plate 34, such that the cell connecting terminals engage conductive traces or busbars or coatings at the rear or fourth surface of the electro-optic reflective element or cell and may be soldered thereat.

Thus, the attachment plate may include wires or a stamping or the like that interfaces directly with the electro-optic reflective element or cell solder tab. Optionally, the connecting terminals of the attaching plate may connect to the electro-optic reflective element or cell via solder or via extendable/retractable spring biased pins or spring contacts or conductive compressible material or the like. The connector terminal side of the conductive elements may be held at the housing or at the attachment plate. The vehicle side connector or wire may connect to the connector terminals of the conductive elements through the housing or through the mirror stay and ball member.

Thus, the circuit board is disposed outside of the mirror head or reflective element assembly, and is mounted in the single ball mirror mounting structure or stay. Such a configuration eliminates a wiring harness that would extend from the stay to the mirror head (with the exception that two wires may be routed through the single ball for electrical connection to the electrochromic mirror reflective element or cell). The sensors view out from behind the stay cover or mount cover and through respective apertures in the cover. Optionally, one or both sensors or sensing functions (glare light sensing and ambient light sensing) may be integrated in a respective camera (such as a rearward viewing camera and a forward viewing camera).

Figure 8:
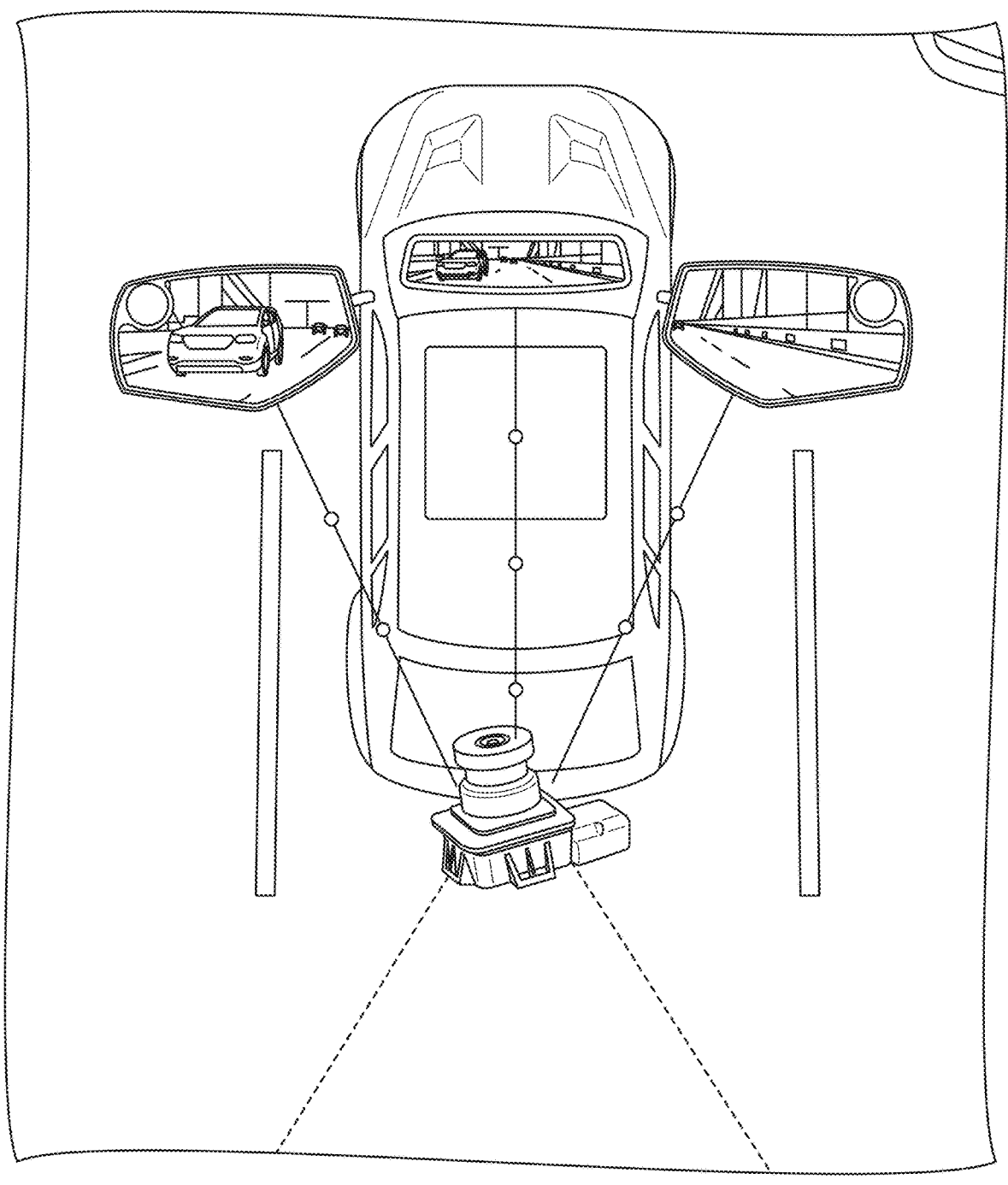
FIG. 8 is a schematic showing a rear backup camera used for independent dimming control of the interior rearview mirror and of each of the exterior rearview mirrors of the vehicle.

Optionally, the mirror assembly may have its dimming control be responsive to image data captured by a rearward viewing camera of the vehicle (such as a rear backup camera of the vehicle), such as by utilizing aspects of the systems described in International Publication No. WO 2017/191558, which is hereby incorporated herein by reference in its entirety. In accordance with such a system, the rear backup camera (FIG. 8) may include processing capabilities or the processor may be part of a backup assist system or the like, where the processor is operable to process image data captured by the rear camera to determine luminance and glare in the captured image data (such as via processing the internal registers to the camera, which contain luminance data for each location or for configurable locations). Responsive to determination of glare (via low-level processing of luminance data), the system may control the EC cell of the interior rearview mirror and/or the EC cell of one or both of the exterior mirrors of the vehicle.

The system thus provides independent EC dimming for each mirror (based on where the glare light is detected in the captured image data), so the system may only dim the interior rearview mirror or may only dim the passenger-side exterior rearview mirror, or may dim any two of the mirrors, depending on the light detection by the rear backup camera. Optionally, the vehicle may have a prismatic interior rearview mirror and electro-optic (such as electrochromic) exterior mirrors, whereby the backup camera captures image data that is processed to determine glare for dimming either or both of the exterior rearview mirrors.

Figure 9:
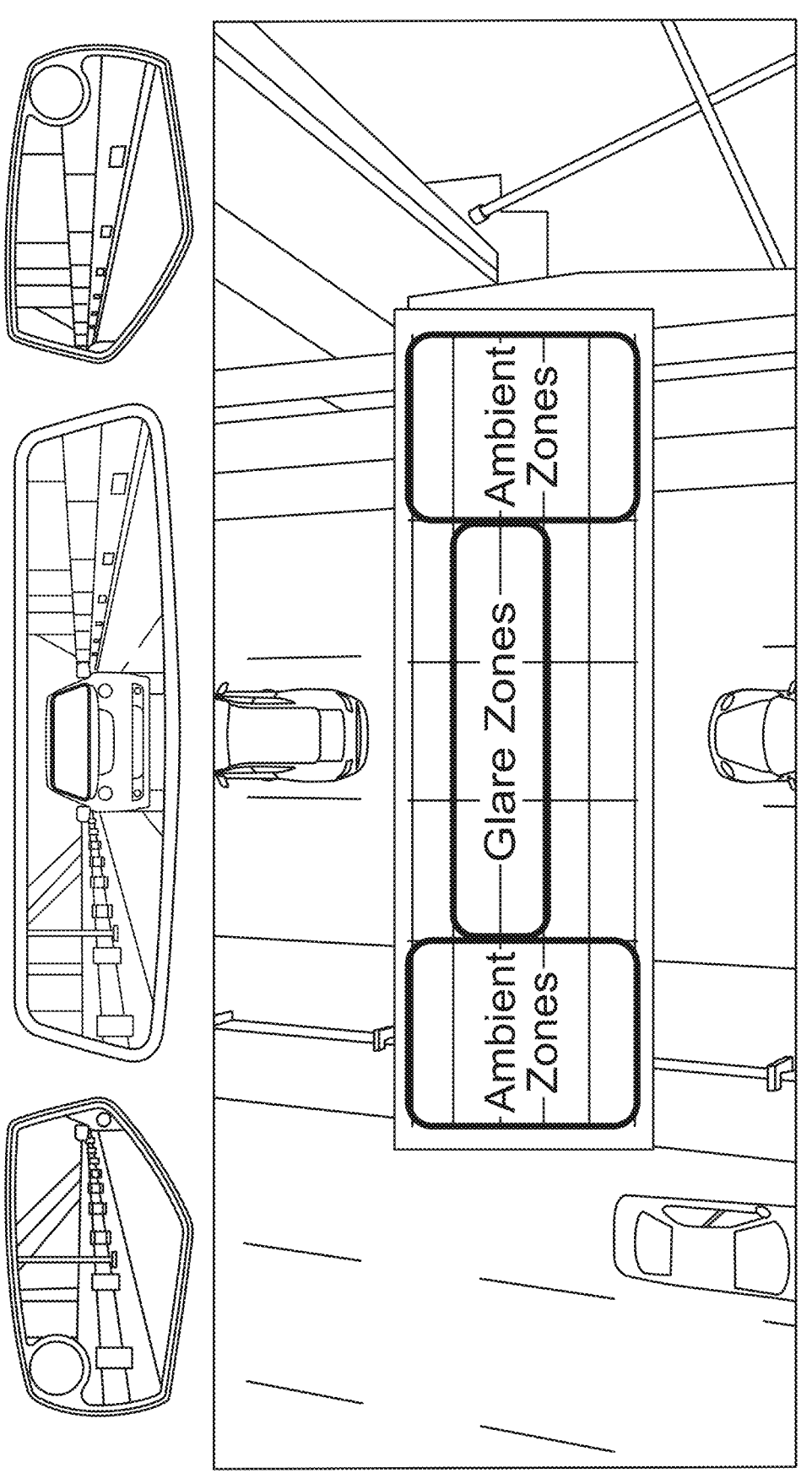
FIG. 9 shows different zones of image data captured by the camera that are processed to detect glare or to detect ambient light.

For example, and such as shown in FIG. 9, the backup camera data can be broken up into a 5×5 grid or 25 sub cells. The internal registers to the camera contain the luminance data for each cell.

As shown in FIG. 9, the rear camera may be used as a sensor for ambient conditions and for glare conditions for the inside and outside mirrors. The processor processes the captured image data and the system controls auto-dimming (such as EC or electrochromic dimming) independently based on where the glare is detected by the imager of the rear backup camera. Specified zones are designated for ambient light and glare light detection. The amount of glare detected in each zone determines the state of the EC dimming for each mirror independently.

Figure 10:
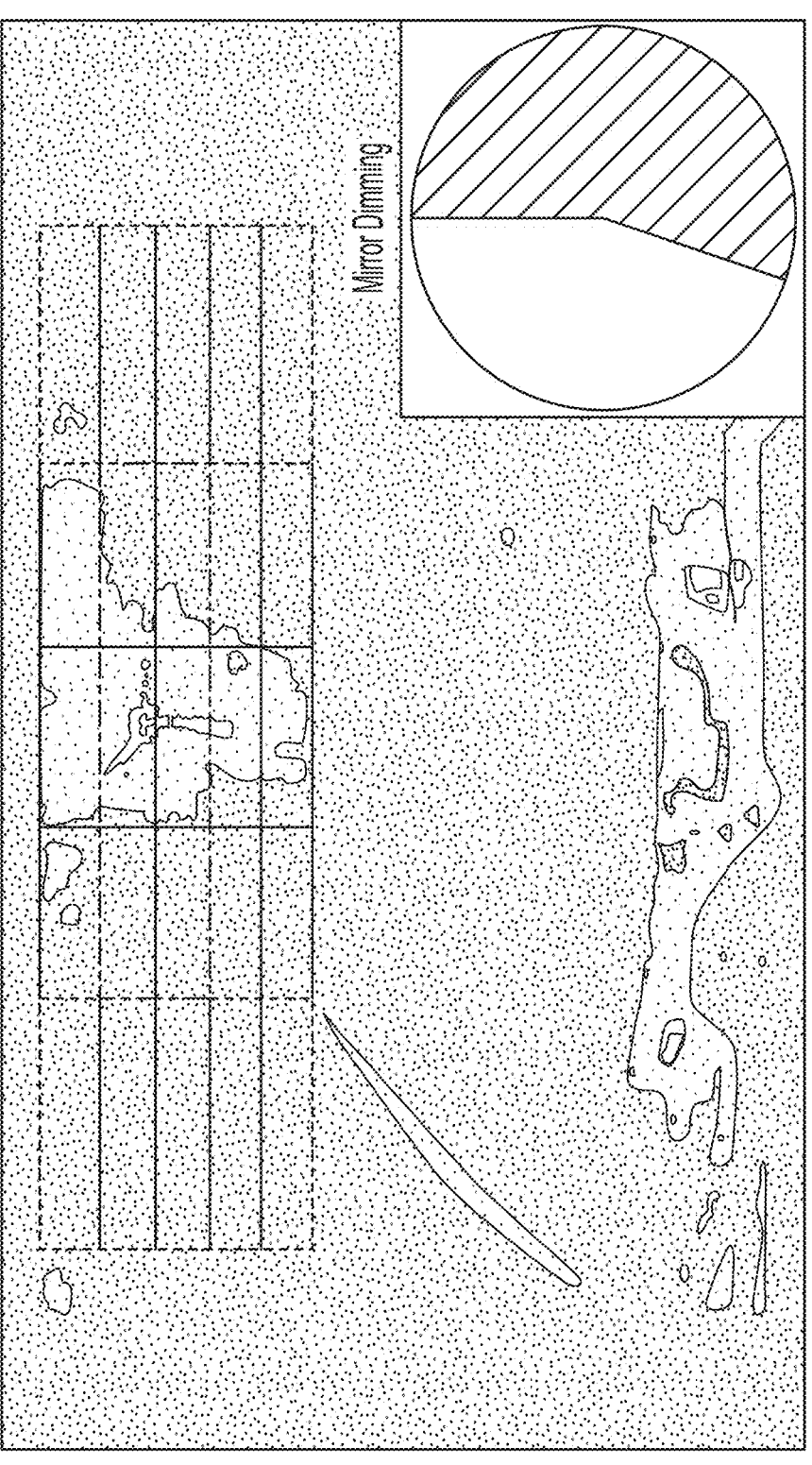
FIG. 10 is another image showing different zones of image data captured by the rear backup camera for detecting glare and ambient light.
Figure 11:
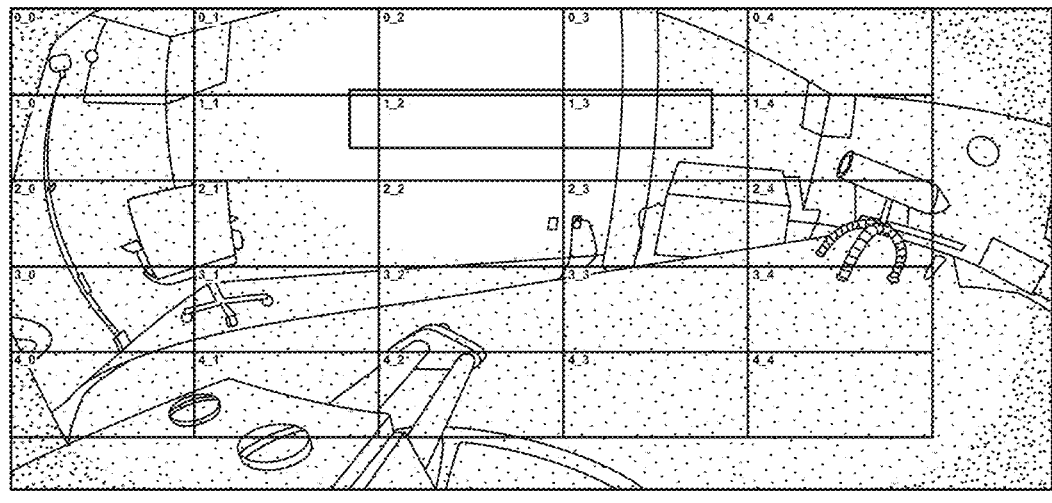
FIGS. 11-13 are images showing different grids applied to captured image data to provide the desired processing for glare and ambient light detection.
Figure 12:
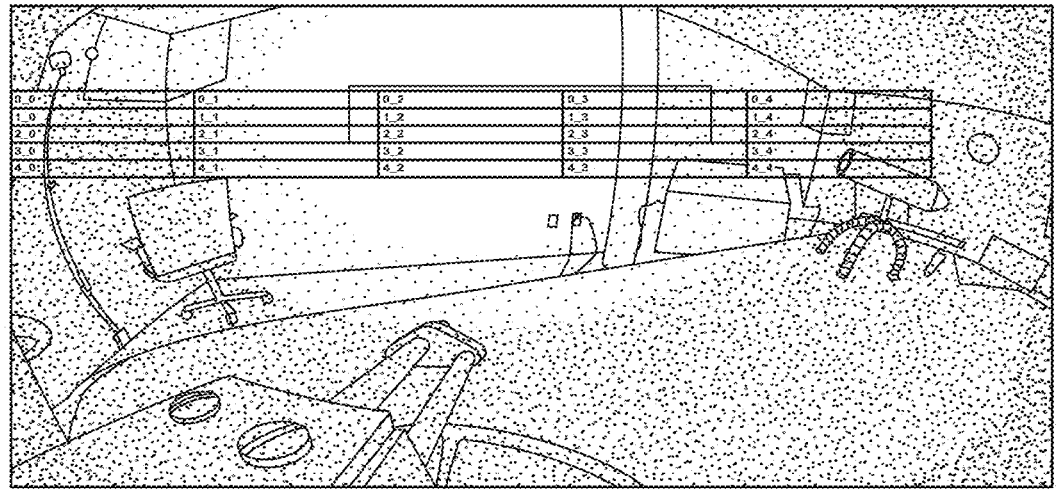
Figure 13:
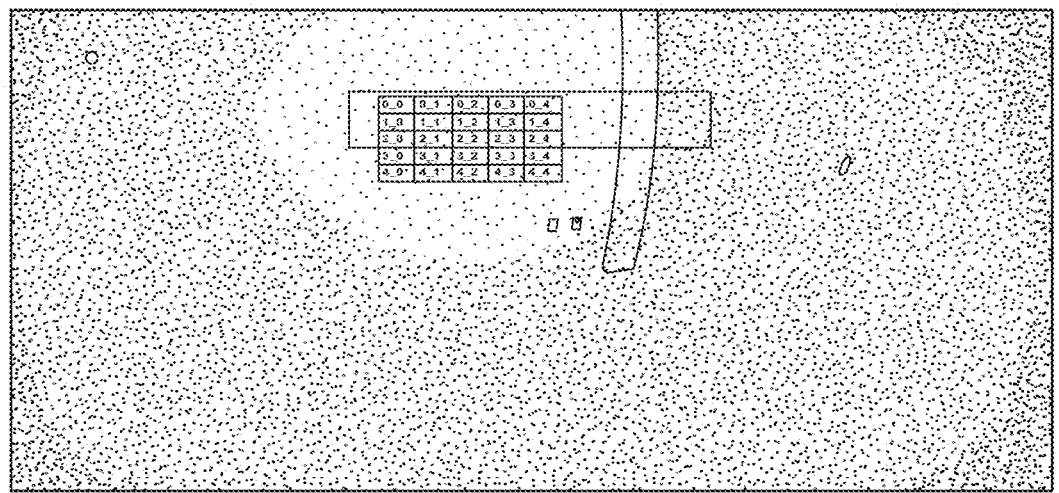
Figure 14:
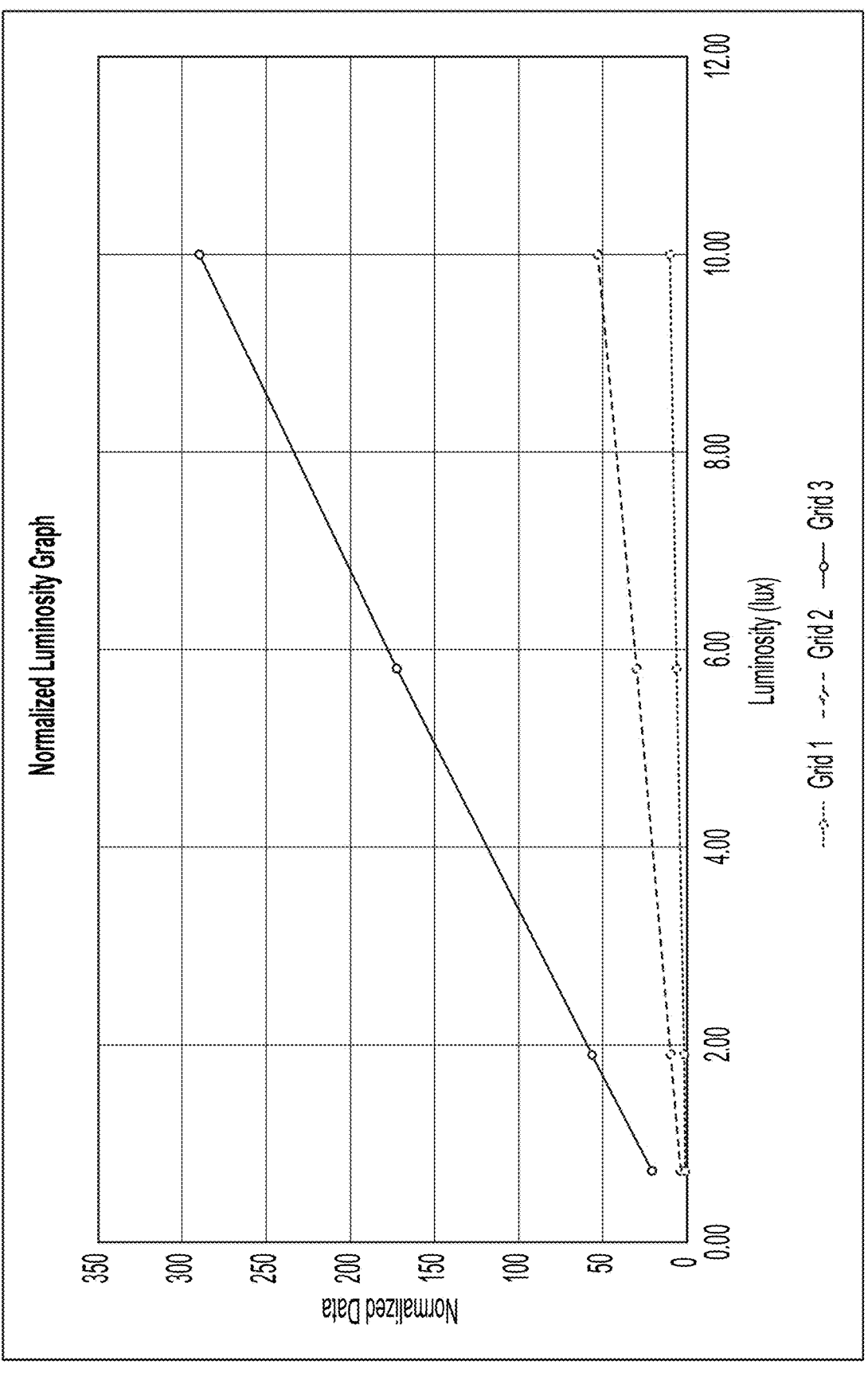
FIG. 14 is a graph showing normalized luminosity for the images of FIGS. 11-13.

As shown in FIG. 10, the zones and 5×5 grid may be applied at an appropriate location of the overall field of view of the rear backup camera, such as where glare light is expected to be detected by rearward approaching vehicles. The grid may be adjustable depending on the light detected by the rear backup camera. For example, when the detected light is far away (such as shown in FIG. 10), the grid may be at an upper region of the captured image data, and when the light is closer, the grid may be at a lower region of the captured image data. For example, and such as can be seen with reference to FIGS. 11-13, the grid may be adjusted or varied for particular applications or responsive to the light intensity of regions of the captured image data (such as by providing a consistent mathematical relationship between the grid "area" and the calculated lux. The grid size can thus be changed dynamically while still maintaining the desired performance of the rear backup camera as a glare light sensor for the interior and/or exterior mirrors (compare, for example, the normalized luminosity graphs of FIG. 14 for Grid 1 (FIG. 11), Grid 2 (FIG. 12) and Grid 3 (FIG. 13)).

Figure 7:
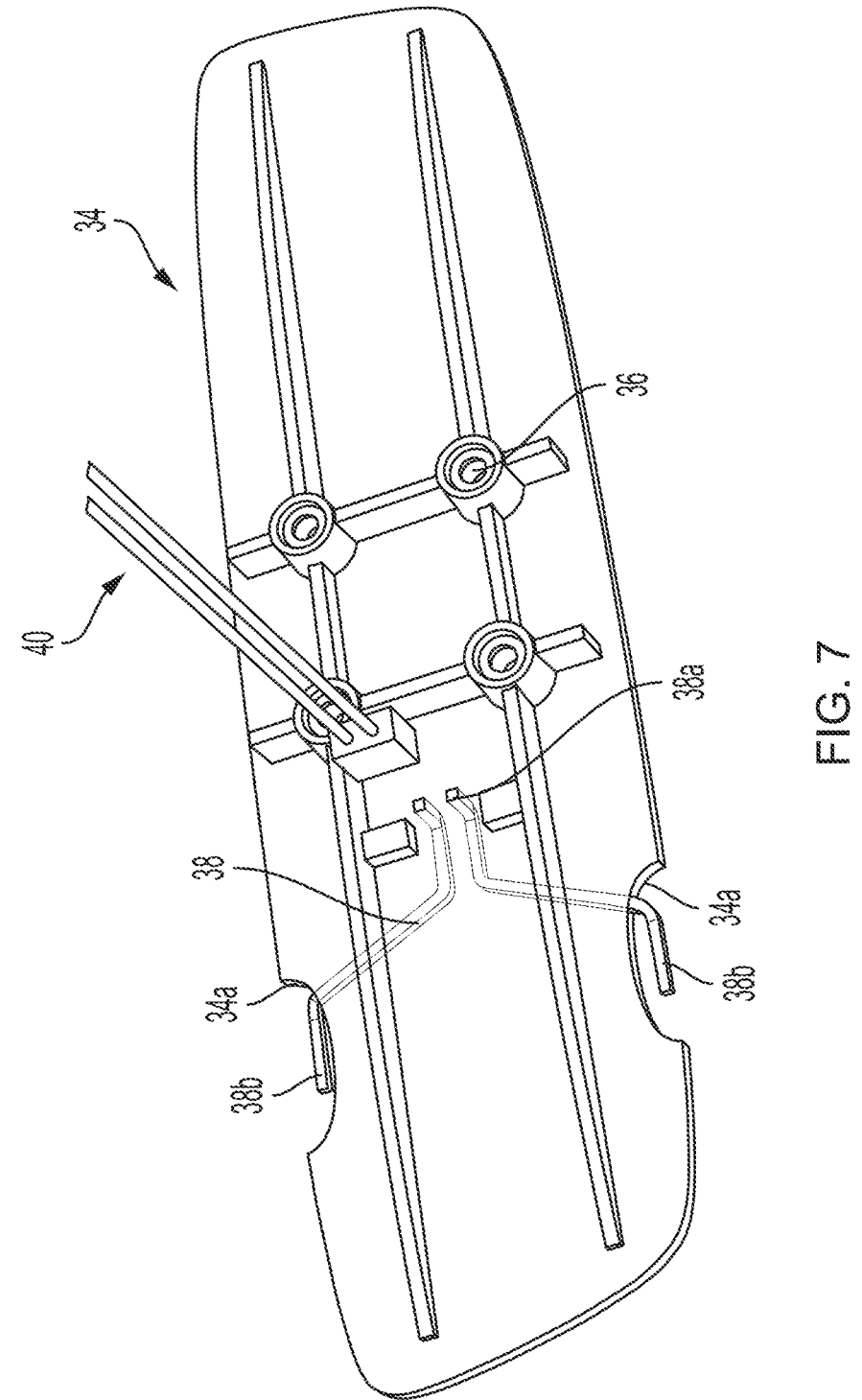
FIG. 7 is a perspective view of an attachment plate with integral electrically conductive elements in accordance with the present invention.

The mirror head thus may comprise a simpler, lower cost mirror head, since the EC drive circuitry may be disposed outside of the mirror head. For example, while a typical circuit board for an interior electrochromic mirror head may include a glare light sensor, an ambient light sensor, and EC drive, and a microprocessor, the system of the present invention allows for at least elimination of the glare light sensor and ambient light sensor, and may also allow for elimination of the microcontroller. Optionally, if the EC drive is also eliminated from the mirror head, the mirror head may simply have a wire EC connection that is connected to a wire harness that communicates the appropriate signal or current to the mirror head to power/dim the electrochromic mirror reflective element (such as, for example, similar to what is shown in FIG. 7). In such an embodiment, the rear backup camera may be connected to a LIN bus and the system may include a LIN EC drive module. The camera may be powered at all times, and the vehicle ECU may provide power or voltage (such as a 1.25 V pulse width modulation or PWM signal) to the mirror or mirrors.

Thus, the present invention (utilizing a rear backup camera for ambient and glare light sensing) provides a lower cost mirror, and may provide a thinner and lighter mirror head (due to the reduction or elimination of the PCB assemblies). Because the ambient sensor is part of the rear backup camera, the ambient sensor is no longer located in the vehicle, such that the system is not adversely affected by cabin lights or by forward lights (such as reflections off of a garage wall of light from the vehicle's headlights when the vehicle is being backed out of the garage). Also, the auto-dimming performance is not impacted or effected by objects that may be hanging from the interior mirror or the like.

Because the ambient and glare light sensing is done by the rear backup camera, the camera should have a clear view rearward of the vehicle. Because the rear backup camera typically does not view through the rear window of the vehicle, the amount of glare detected by the camera may be different than the glare at the interior rearview mirror (due to tinting of the rear window). Thus, the system may adjust or vary the processing responsive to a determined or input level of tint of the rear window, so that the glare is properly determined by the rear backup camera. Optionally, the rear viewing camera may be disposed behind and viewing through the rear window (such as at a region swept by a rear windshield wiper), such that the tint is at least partially taken into account before processing.

The rear backup camera may communicate signals (such as via a LIN communication bus or CAN bus or an I2C communication or the like) to a head unit or ECU of the vehicle, which may process the captured data and communicate signals to the appropriate mirror (e.g., directly or via another controller or bus node or the like) or to a door module of the vehicle (for the exterior mirrors). For example, the head unit or ECU may communicate signals to an EC driver of the respective mirrors, whereby the signals are representative of the processed glare light and ambient light, and the EC driver then generates the appropriate current or output to provide the appropriate dimming of the respective mirror. Optionally, for example, the head unit or ECU may communicate power signals that are provided directly to the EC cells of the respective mirrors to individually control dimming of the mirrors.

Conventionally, vehicles, such as cars, SUVs, light trucks, vans, etc., when equipped with an electrochromic rearview mirror, are outfitted with at least an interior electrochromic rearview mirror assembly. Often, at least one driver-side exterior sideview mirror, and often both a driver-side and a passenger-side electrochromic exterior sideview mirror, are provided at the vehicle, but with the interior electrochromic rearview mirror assembly providing electrochromic dimming control for the exterior electrochromic sideview assemblies, which act as slave mirrors to the master control of the interior electrochromic assembly.

While this works well in many vehicles, it does not work in the likes of vans, shuttle buses, and similar vehicles, where either no rear window is provided for an interior rearview mirror assembly to view through, or where the interior rearview mirror's view rearward of the vehicle is obstructed. Moreover, even when such is not the case, provision of the likes of a driver-side electrochromic sideview mirror assembly requires the presence of an interior electrochromic mirror assembly, thus potentially driving costs of the overall system.

The electrochromic rearview mirror element typically requires a direct current (DC) voltage in the range of more than 0 volts to 1.5 volts or thereabouts, in order to achieve electrochromic dimming. Moreover, when electrochromic dimming, and depending on the surface area of the electrochromic active region of the mirror, the current draw by the electrochromic mirror element can be in the range of 50 mA to 150 mA or thereabouts. In accordance with the present invention, the rear backup camera provides dual functionality of both serving as a FMVSS-111 compliant rear backup camera and also capturing ambient light and glaring light data, as discussed above. In a preferred embodiment, and such as shown in FIG. 15, the vehicle has an interior electrochromic or auto-dimming mirror and both a driver-side and passenger-side electrochromic or auto-dimming mirror. The backup camera communicates data to an electronic control unit (ECU) of the vehicle, such as over a CAN bus or LIN bus or I2C communication or the like. The ECU can drive the interior auto-dimming mirror independently or another control unit of the vehicle can drive the mirror. The vehicle includes a door module unit (DMU) at each of the driver-side door and the passenger-side door. The ECU communicates with the DMU, such as over a CAN bus or a LIN bus or an I2C communication or the like. The driver-side DMU drives the driver-side exterior auto-dimming mirror independently, and the passenger-side DMU drives the passenger-side exterior auto-dimming mirror independently. The backup camera thus determines when any one (or more) of the auto-dimming mirrors independently colors or dims.

Optionally, and such as shown in FIG. 16, the vehicle may not have an auto-dimming passenger-side mirror. In such an embodiment, the ECU, responsive to communication from the rear backup camera, communicates control signals to the interior auto-dimming mirror and to the driver-side DMU, which drives the driver-side exterior auto-dimming mirror independently of the interior auto-dimming mirror. Optionally, and such as shown in FIG. 17, the vehicle may not have a driver-side or a passenger-side auto-dimming mirror, whereby the ECU may, responsive to signals received from the rear backup camera, communicate control signals to the interior auto-dimming mirror.

Optionally, and such as shown in FIG. 18, the vehicle may include a driver-side exterior auto-dimming mirror and a passenger-side exterior auto-dimming mirror, and a prismatic (non-auto-dimming) interior mirror. In such an embodiment, the ECU, responsive to signals received from the rear backup camera, communicates with the driver-side DMU and the passenger-side DMU, such as over a CAN bus or a LIN bus or an I2C communication or the like. The driver-side DMU drives the driver-side exterior auto-dimming mirror independently, and the passenger-side DMU drives the passenger-side exterior auto-dimming mirror independently. The backup camera thus determines when either or both of the exterior auto-dimming mirrors independently colors or dims. Optionally, and such as shown in FIG. 19, the vehicle may not have an auto-dimming passenger-side mirror. In such an embodiment, the ECU, responsive to communication from the rear backup camera, communicates control signals to the driver-side DMU, which drives the driver-side exterior auto-dimming mirror.

Optionally, and such as shown in FIG. 20, the vehicle may have a surround view vision system that comprises a plurality of exterior viewing cameras, including a rear backup camera, a front forward viewing camera, and opposite side side-mounted sideward viewing cameras. In the illustrated embodiment, the vision system includes two windshield-mounted, forward viewing cameras and a bed camera (that views into the bed of the pickup truck) and a rearward viewing camera for capturing image data to provide a rear view display at the full mirror display (such as by utilizing aspects of the display systems described in U.S. Publication Nos. US-2018-0251069; US-2017-0355312; US-2017-0297498 and/or US-2016-0375833, which are all hereby incorporated herein by reference in their entireties.

As shown in FIG. 20, the ECU communicates with each of the cameras of the vehicle vision system and communicates with the interior auto-dimming mirror and with the door module units (which communicate with the exterior auto-dimming mirrors). The backup camera communicates data to the electronic control unit (ECU) of the vehicle, such as over a CAN bus or LIN bus or I2C communication or the like. The ECU can drive the interior auto-dimming mirror independently or another control unit of the vehicle can drive the mirror. The vehicle includes a door module unit (DMU) at each of the driver-side door and the passenger-side door. The ECU communicates with the DMUs, such as over a CAN bus or a LIN bus or an I2C communication or the like. The driver-side DMU drives the driver-side exterior auto-dimming mirror independently (responsive to the communication from the ECU), and the passenger-side DMU drives the passenger-side exterior auto-dimming mirror independently (responsive to the communication from the ECU). The backup camera thus determines when any one (or more) of the auto-dimming mirrors independently colors or dims. Optionally, the ECU may generate the signals to the interior auto-dimming mirror and/or the DMUs responsive to image data received from one or more of the other cameras of the vehicle.

Thus, the system of the present invention can, using the rear backup camera (and not using a separate ambient light sensor and glare sensor), independently control the dimming or coloring of each of the auto-dimming mirrors of the vehicle, responsive at least in part to where glare light is detected (via processing of data captured by the rear backup camera) rearward of the vehicle. The ECU is operable to communicate with the DMU(s) to provide control instructions or signals for the respective auto-dimming exterior mirror. The DMUs may comprise LIN modules, and the ECU communicates a control signal to each DMU that indicates the amount of dimming for that respective exterior mirror, whereby the DMU then generates a 1.3 volt or 1.5 volt signal and using PWM, it communicates the appropriate signal to that exterior mirror to dim that mirror the appropriate amount. Since the camera is already providing information onto the network or bus, the camera's information or data can be of the same type of information and can be used instead of the information provided by a known EC driver of an interior rearview mirror (which conventionally would drive the dimming of the exterior mirror or mirrors). Since the LIN door controller modules are already there, they can independently dim the exterior mirrors (independent even of the presence of an auto-dimming interior mirror) responsive to the communication from the ECU (instead of the interior mirror EC driver).

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037 and/or 7,360,932, which are hereby incorporated herein by reference in their entireties), or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges (such as by utilizing aspects of the mirror assemblies described in U.S. Pat. Nos. 8,508,831; 8,730,553; 9,598,016 and/or 9,346,403, and/or U.S. Publication Nos. US-2014-0313563 and/or US-2015-0097955, which are hereby incorporated herein by reference in their entireties, and with electrochromic and prismatic mirrors of such construction are commercially available from the assignee of this application under the trade name INFINITY™ mirror).

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274, 501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, and/or PCT Application No. PCT/US2010/029173, filed Mar. 30, 2010, which are hereby incorporated herein by reference in their entireties.

Optionally, the reflective element may include an opaque or substantially opaque or hiding perimeter layer or coating or band disposed around a perimeter edge region of the front substrate (such as at a perimeter region of the rear or second surface of the front substrate) to conceal or hide or the perimeter seal from viewing by the driver of the vehicle when the mirror assembly is normally mounted in the vehicle. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190 and/or 7,255,451, and/or International Publication Nos. WO 2010/124064 and/or WO 2011/044312, and/or U.S. Pat. Pub. No. US-2006-0061008, which are all hereby incorporated herein by reference in their entireties. Optionally, the perimeter band may comprise a chrome/chromium coating or metallic coating and/or may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. Nos. 7,184,190 and/or 7,255,451, which are hereby incorporated herein by reference in their entireties). Optionally, other opaque or substantially opaque coatings or bands may be implemented while remaining within the spirit and scope of the present invention.

The mirror assembly may comprise or utilize aspects of other types of casings or the like, such as described in U.S. Pat. Nos. 7,338,177; 7,289,037; 7,249,860; 6,439,755; 4,826,289 and/or 6,501,387, which are all hereby incorporated herein by reference in their entireties, without affecting the scope of the present invention. For example, the mirror assembly may utilize aspects of the flush or frameless or bezelless reflective elements described in U.S. Pat. Nos. 7,626,749; 7,360,932; 7,289,037; 7,255,451; 7,274,501 and/or 7,184,190, which are all hereby incorporated herein by reference in their entireties.

Although shown as an electrochromic mirror application, it is envisioned that the mirror assembly may comprise a prismatic reflective element, while remaining within the spirit and scope of the present invention. The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 6,318,870 and/or 7,249,860, and/or U.S. Publication No. US-2010-0085653, which are hereby incorporated herein by reference in their entireties. Optionally, for example, the interior rearview mirror assembly may comprise a prismatic mirror assembly, such as the types described in U.S. Pat. Nos. 7,289,037; 7,420,756; 7,274,501; 7,338,177; 7,255,451; 7,249,860; 6,318,870; 6,598,980; 5,327,288; 4,948,242; 4,826,289; 4,436,371 and 4,435,042, which are hereby incorporated herein by reference in their entireties. A variety of mirror accessories and constructions are known in the art, such as those disclosed in U.S. Pat. Nos. 5,555,136; 5,582,383; 5,680,263; 5,984, 482; 6,227,675; 6,229,319 and/or 6,315,421 (which are hereby incorporated herein by reference in their entireties), that can benefit from the present invention.

Changes and modifications in the specifically described embodiments may be carried out without departing from the principles of the present invention, which is intended to be limited only by the scope of the appended claims as interpreted according to the principles of patent law.

The invention claimed is:

1. A vehicular rearview mirror control system, the vehicular rearview mirror control system comprising:
    an interior rearview mirror assembly attached at an interior portion of a vehicle equipped with the vehicular rearview mirror control system, the interior rearview mirror assembly comprising an electro-optic mirror reflective element;
    a rearward-viewing camera disposed at the equipped vehicle, the rearward-viewing camera viewing at least rearward of the equipped vehicle, wherein the rearward-viewing camera is operable to capture image data;
    wherein image data captured by the rearward-viewing camera is transferred to an electronic control unit (ECU) of the equipped vehicle;
    wherein the ECU is operable to process image data captured by the rearward-viewing camera and transferred to the ECU;
    wherein the ECU, via processing of a first subset of image data captured by the rearward-viewing camera and transferred to the ECU, is operable to detect ambient light rearward of the equipped vehicle;
    wherein the ECU, via processing of a second subset of the image data captured by the rearward-viewing camera and transferred to the ECU, is operable to detect light emanating from a headlight of another vehicle following the equipped vehicle;
    wherein the first subset of the image data captured by the rearward-viewing camera is different than the second subset of the image data captured by the rearward-viewing camera; and
    wherein, responsive to determining that the detected light emanating from the headlight of the other vehicle glares a driver of the equipped vehicle, the ECU controls dimming of the electro-optic mirror reflective element of the interior rearview mirror assembly.

2. The vehicular rearview mirror control system of claim 1, wherein the first subset of the image data is representative of a first zone exterior of the equipped vehicle, and wherein the second subset of the image data is representative of a second zone exterior of the equipped vehicle.

3. The vehicular rearview mirror control system of claim 1, wherein processing of the second subset of the image data distinguishes light emanating from the headlight of the other vehicle from ambient light.

4. The vehicular rearview mirror control system of claim 1, wherein processing of the first subset of the image data distinguishes ambient light from light emanating from the headlight of the other vehicle.

5. The vehicular rearview mirror control system of claim 1, wherein the ECU determines that the detected light emanating from the headlight of the other vehicle glares the driver of the equipped vehicle based at least in part on distance from the equipped vehicle to the other vehicle.

6. The vehicular rearview mirror control system of claim 5, wherein the second subset of the image data captured by the rearward-viewing camera is selected based at least in part on distance from the equipped vehicle to the other vehicle.

7. The vehicular rearview mirror control system of claim 1, wherein the ECU determines that the detected light emanating from the headlight of the other vehicle glares the driver of the equipped vehicle based at least in part on light intensity detected at the second subset of the image data captured by the rearward-viewing camera.

8. The vehicular rearview mirror control system of claim 7, wherein the second subset of the image data captured by the rearward-viewing camera is selected based at least in part on light intensity detected at the second subset of the image data captured by the rearward-viewing camera.

9. The vehicular rearview mirror control system of claim 1, wherein the rearward-viewing camera comprises a rear backup camera of the equipped vehicle.

10. The vehicular rearview mirror control system of claim 1, further comprising a driver-side exterior rearview mirror assembly attached at a driver side of the equipped vehicle, the driver-side exterior rearview mirror assembly comprising a driver-side electro-optic mirror reflective element, and wherein, responsive to determining that the detected light emanating from the headlight of the other vehicle is at a driver-side region within a field of view of the rearward-viewing camera and glares the driver of the equipped vehicle, the ECU controls dimming of the driver-side electro-optic mirror reflective element of the driver-side exterior rearview mirror assembly.

11. The vehicular rearview mirror control system of claim 10, wherein the driver-side exterior rearview mirror assembly is attached at a driver-side door of the equipped vehicle, and wherein the ECU controls dimming of the driver-side electro-optic mirror reflective element of the driver-side exterior rearview mirror assembly by generating a signal to a driver-side door control module (DMU), and wherein, responsive to the signal generated by the ECU, the driver-side DMU dims the driver-side electro-optic mirror reflective element.

12. The vehicular rearview mirror control system of claim 11, wherein the driver-side DMU dims the driver-side electro-optic mirror reflective element using PWM.

13. The vehicular rearview mirror control system of claim 10, wherein the driver-side electro-optic mirror reflective element of the driver-side exterior rearview mirror assembly comprises a driver-side electrochromic mirror reflective element.

14. The vehicular rearview mirror control system of claim 10, wherein the ECU generates a control signal that is communicated to the driver-side electro-optic mirror reflective element of the driver-side exterior rearview mirror assembly via a communication bus of the equipped vehicle.

15. The vehicular rearview mirror control system of claim 14, wherein the communication bus comprises a CAN bus of the equipped vehicle.

16. The vehicular rearview mirror control system of claim 14, wherein the communication bus comprises a LIN bus of the equipped vehicle.

17. The vehicular rearview mirror control system of claim 1, comprising a passenger-side exterior rearview mirror assembly attached at a passenger side of the equipped vehicle, the passenger-side exterior rearview mirror assembly comprising a passenger-side electro-optic mirror reflective element, wherein, responsive to determining that the detected light emanating from the headlight of the other vehicle is at a passenger-side region within a field of view of the rearward-viewing camera and glares the driver of the equipped vehicle, the ECU controls dimming of the passenger-side electro-optic mirror reflective element of the passenger-side exterior rearview mirror assembly.

18. The vehicular rearview mirror control system of claim 1, wherein the electro-optic mirror reflective element comprises an electrochromic mirror reflective element.

19. A vehicular rearview mirror control system, the vehicular rearview mirror control system comprising:

an interior rearview mirror assembly attached at an interior portion of a vehicle equipped with the vehicular rearview mirror control system, the interior rearview mirror assembly comprising an electro-optic mirror reflective element;

a rearward-viewing camera disposed at the equipped vehicle, the rearward-viewing camera viewing at least rearward of the equipped vehicle, wherein the rearward-viewing camera is operable to capture image data;

wherein image data captured by the rearward-viewing camera is transferred to an electronic control unit (ECU) of the equipped vehicle;

wherein the ECU is operable to process image data captured by the rearward-viewing camera and transferred to the ECU;

wherein the ECU, via processing of a first subset of image data captured by the rearward-viewing camera and transferred to the ECU, is operable to detect ambient light rearward of the equipped vehicle;

wherein the ECU, via processing of a second subset of the image data captured by the rearward-viewing camera and transferred to the ECU, is operable to detect light emanating from a headlight of another vehicle following the equipped vehicle;

wherein the first subset of the image data captured by the rearward-viewing camera is different than the second subset of the image data captured by the rearward-viewing camera;

wherein the first subset of the image data is representative of a first zone exterior of the equipped vehicle, and wherein the second subset of the image data is representative of a second zone exterior of the equipped vehicle;

wherein the second subset of the image data captured by the rearward-viewing camera is selected based at least in part on at least one selected from the group consisting of (i) distance from the equipped vehicle to the other vehicle following the equipped vehicle and (ii) light intensity detected at the second subset of the image data captured by the rearward-viewing camera; and wherein, responsive to determining that the detected light emanating from the headlight of the other vehicle glares a driver of the equipped vehicle, the ECU controls dimming of the electro-optic mirror reflective element of the interior rearview mirror assembly.

20. The vehicular rearview mirror control system of claim 19, wherein the ECU determines that the detected light emanating from the headlight of the other vehicle glares the driver of the equipped vehicle based at least in part on distance from the equipped vehicle to the other vehicle.

21. The vehicular rearview mirror control system of claim 19, wherein the ECU determines that the detected light emanating from the headlight of the other vehicle glares the driver of the equipped vehicle based at least in part on light intensity detected at the second subset of the image data captured by the rearward-viewing camera.

22. The vehicular rearview mirror control system of claim 19, wherein the rearward-viewing camera comprises a rear backup camera of the equipped vehicle.

23. The vehicular rearview mirror control system of claim 19, further comprising a driver-side exterior rearview mirror assembly attached at a driver side of the equipped vehicle, the driver-side exterior rearview mirror assembly comprising a driver-side electro-optic mirror reflective element, and wherein, responsive to determining that the detected light emanating from the headlight of the other vehicle is at a driver-side region within the second zone exterior of the equipped vehicle and glares the driver of the equipped vehicle, the ECU controls dimming of the driver-side electro-optic mirror reflective element of the driver-side exterior rearview mirror assembly.

24. The vehicular rearview mirror control system of claim 23, wherein the driver-side exterior rearview mirror assembly is attached at a driver-side door of the equipped vehicle, and wherein the ECU controls dimming of the driver-side electro-optic mirror reflective element of the driver-side exterior rearview mirror assembly by generating a signal to a driver-side door control module (DMU), and wherein, responsive to the signal generated by the ECU, the driver-side DMU dims the driver-side electro-optic mirror reflective element.

25. The vehicular rearview mirror control system of claim 23, comprising a passenger-side exterior rearview mirror assembly attached at a passenger side of the equipped vehicle, the passenger-side exterior rearview mirror assembly comprising a passenger-side electro-optic mirror reflective element, wherein, responsive to determining that the detected light emanating from the headlight of the other vehicle is at a passenger-side region within the second zone exterior of the equipped vehicle and glares the driver of the equipped vehicle, the ECU controls dimming of the passenger-side electro-optic mirror reflective element of the passenger-side exterior rearview mirror assembly.

26. The vehicular rearview mirror control system of claim 19, wherein the electro-optic mirror reflective element comprises an electrochromic mirror reflective element.

27. A vehicular rearview mirror control system, the vehicular rearview mirror control system comprising:

an interior rearview mirror assembly attached at an interior portion of a vehicle equipped with the vehicular rearview mirror control system, the interior rearview mirror assembly comprising an electrochromic mirror reflective element;

a rearward-viewing camera disposed at the equipped vehicle, the rearward-viewing camera viewing at least rearward of the equipped vehicle, wherein the rearward-viewing camera is operable to capture image data;

wherein image data captured by the rearward-viewing camera is transferred to an electronic control unit (ECU) of the equipped vehicle;

wherein the ECU is operable to process image data captured by the rearward-viewing camera and transferred to the ECU;

wherein the ECU, via processing of a first subset of image data captured by the rearward-viewing camera and transferred to the ECU, is operable to detect ambient light rearward of the equipped vehicle;

wherein the ECU, via processing of a second subset of the image data captured by the rearward-viewing camera and transferred to the ECU, is operable to detect light emanating from a headlight of another vehicle following the equipped vehicle;

wherein the first subset of the image data captured by the rearward-viewing camera is different than the second subset of the image data captured by the rearward-viewing camera;

wherein the first subset of the image data is representative of a first zone exterior of the equipped vehicle, and wherein the second subset of the image data is representative of a second zone exterior of the equipped vehicle;

wherein the ECU determines that the detected light emanating from the headlight of the other vehicle glares a driver of the equipped vehicle based at least in part on at least one selected from the group consisting of (i) distance from the equipped vehicle to the other vehicle following the equipped vehicle and (ii) light intensity detected at the second subset of the image data captured by the rearward-viewing camera; and wherein, responsive to determining that the detected light emanating from the headlight of the other vehicle glares the driver of the equipped vehicle, the ECU controls dimming of the electrochromic mirror reflective element of the interior rearview mirror assembly.

28. The vehicular rearview mirror control system of claim 27, wherein processing of the second subset of the image data distinguishes light emanating from the headlight of the other vehicle from ambient light.

29. The vehicular rearview mirror control system of claim 27, wherein processing of the first subset of the image data distinguishes ambient light from light emanating from the headlight of the other vehicle.

30. The vehicular rearview mirror control system of claim 27, wherein the rearward-viewing camera comprises a rear backup camera of the equipped vehicle.

31. The vehicular rearview mirror control system of claim 27, further comprising a driver-side exterior rearview mirror assembly attached at a driver side of the equipped vehicle, the driver-side exterior rearview mirror assembly comprising a driver-side electrochromic mirror reflective element, and wherein, responsive to determining that the detected light emanating from the headlight of the other vehicle is at a driver-side region within the second zone exterior of the equipped vehicle and glares the driver of the equipped vehicle, the ECU controls dimming of the driver-side electrochromic mirror reflective element of the driver-side exterior rearview mirror assembly.

32. The vehicular rearview mirror control system of claim 31, wherein the driver-side exterior rearview mirror assembly is attached at a driver-side door of the equipped vehicle, and wherein the ECU controls dimming of the driver-side electrochromic mirror reflective element of the driver-side exterior rearview mirror assembly by generating a signal to a driver-side door control module (DMU), and wherein, responsive to the signal generated by the ECU, the driver-side DMU dims the driver-side electrochromic mirror reflective element.

33. The vehicular rearview mirror control system of claim 31, comprising a passenger-side exterior rearview mirror assembly attached at a passenger side of the equipped vehicle, the passenger-side exterior rearview mirror assembly comprising a passenger-side electrochromic mirror reflective element, wherein, responsive to determining that the detected light emanating from the headlight of the other vehicle is at a passenger-side region within the second zone exterior of the equipped vehicle and glares the driver of the equipped vehicle, the ECU controls dimming of the passenger-side electrochromic mirror reflective element of the passenger-side exterior rearview mirror assembly.

* * * * *